United States Patent
Aitharaju et al.

(10) Patent No.: US 11,780,185 B2
(45) Date of Patent: Oct. 10, 2023

(54) REINFORCED COMPOSITE ASSEMBLIES AND METHODS OF MANUFACTURING THE SAME

(71) Applicant: GM GLOBAL TECHNOLOGY OPERATIONS LLC, Detroit, MI (US)

(72) Inventors: Venkateshwar R. Aitharaju, Troy, MI (US); Princess Len Carlos, Sterling Heights, MI (US); Erik B. Golm, Warren, MI (US); Terrence Wathen, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 189 days.

(21) Appl. No.: 17/193,010

(22) Filed: Mar. 5, 2021

(65) Prior Publication Data

US 2022/0281186 A1  Sep. 8, 2022

(51) Int. Cl.
  *B29C 70/72*   (2006.01)
  *B29C 70/68*   (2006.01)
  *B29C 71/02*   (2006.01)
  *B32B 3/26*    (2006.01)
  *B32B 5/06*    (2006.01)
  (Continued)

(52) U.S. Cl.
  CPC ............ *B29C 70/72* (2013.01); *B29C 70/682* (2013.01); *B29C 70/683* (2013.01); *B29C 71/02* (2013.01);
  (Continued)

(58) Field of Classification Search
  CPC ........... B32B 15/14; B32B 7/09; B32B 3/266; D05B 93/00
  See application file for complete search history.

(56) References Cited

U.S. PATENT DOCUMENTS

| 2005/0003140 A1 | 1/2005 | Zafiroglu |
| 2013/0236692 A1 | 9/2013 | Tanaka |

(Continued)

FOREIGN PATENT DOCUMENTS

| CN | 103213289 A | 7/2013 |
| CN | 103240893 A | 8/2013 |

(Continued)

OTHER PUBLICATIONS

DE 102005013154 A1, English translation (Year: 2006).*
DE 102008026231 B4, English translation (Year: 2016).*
DE 102013107727 A1, English translation (Year: 2015).*

*Primary Examiner* — Frank J Vineis
*Assistant Examiner* — Nicole T Gugliotta
(74) *Attorney, Agent, or Firm* — Quinn IP Law

(57) ABSTRACT

A reinforced composite assembly includes a first sheet made of carbon fiber and having a first perimeter, a second sheet made of a non-carbon fiber material and having a second perimeter, wherein the second sheet is disposed atop the first sheet within the first perimeter, and a metallic plate having a third perimeter, wherein the metallic plate is disposed atop the second sheet within the second perimeter. The metallic plate has a plurality of holes formed therein about a perimeter of the metallic plate and defining a plurality of respective bridge portions between each of the holes and an adjacent outer edge of the metallic plate, and/or a plurality of extensions extending outward from a main portion of the metallic plate. A first arrangement of thread stitching secures each of the bridge portions and extensions to the second sheet or to the first and second sheets.

20 Claims, 17 Drawing Sheets

(51) Int. Cl.
  *B32B 5/26* (2006.01)
  *B32B 7/03* (2019.01)
  *B32B 7/00* (2019.01)
  *B32B 15/14* (2006.01)
  *D05B 93/00* (2006.01)
  *B32B 7/09* (2019.01)
  *B29K 105/20* (2006.01)
  *B29K 705/00* (2006.01)
  *B29K 707/04* (2006.01)

(52) U.S. Cl.
  CPC ............ *B32B 3/266* (2013.01); *B32B 5/06* (2013.01); *B32B 5/26* (2013.01); *B32B 7/03* (2019.01); *B32B 7/09* (2019.01); *B32B 15/14* (2013.01); *D05B 93/00* (2013.01); *B29K 2105/20* (2013.01); *B29K 2705/00* (2013.01); *B29K 2707/04* (2013.01); *B29K 2713/00* (2013.01); *B32B 2262/106* (2013.01)

(56) References Cited

U.S. PATENT DOCUMENTS

| | | |
|---|---|---|
| 2015/0197070 A1 | 7/2015 | Freis et al. |
| 2016/0075105 A1 | 3/2016 | Lamberty et al. |
| 2016/0312616 A1 | 10/2016 | Notarianni et al. |
| 2017/0217061 A1 | 8/2017 | Roche et al. |
| 2018/0144734 A1* | 5/2018 | Wang .................. B32B 27/40 |
| 2019/0157251 A1 | 5/2019 | Singer |
| 2020/0049283 A1 | 2/2020 | Chase |

FOREIGN PATENT DOCUMENTS

| | | |
|---|---|---|
| CN | 104276274 A | 1/2015 |
| CN | 105593077 A | 5/2016 |
| CN | 107075763 A | 8/2017 |
| CN | 107618227 A | 1/2018 |
| CN | 108215377 A | 6/2018 |
| CN | 108799274 A | 11/2018 |
| CN | 109050682 A | 12/2018 |
| CN | 112292289 A | 1/2021 |
| DE | 102005013154 A1 * | 10/2006 |
| DE | 102012223220 A1 | 6/2014 |
| DE | 102013107727 A1 * | 1/2015 |
| DE | 201310220337 A1 | 4/2015 |
| DE | 102008026231 B4 * | 8/2016 |
| EP | 2832526 A1 | 2/2015 |
| WO | WO200407176 A1 | 8/2004 |
| WO | WO 2019/014096 A1 * | 1/2019 |

* cited by examiner

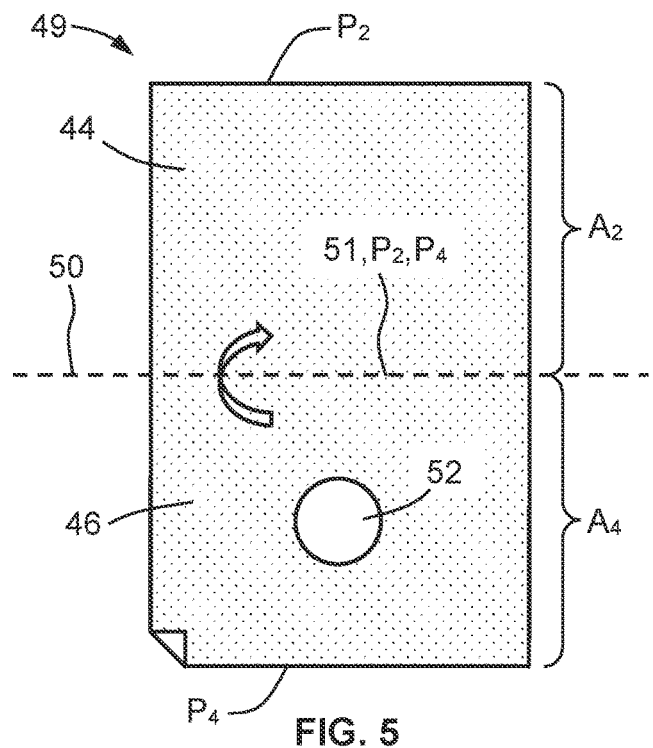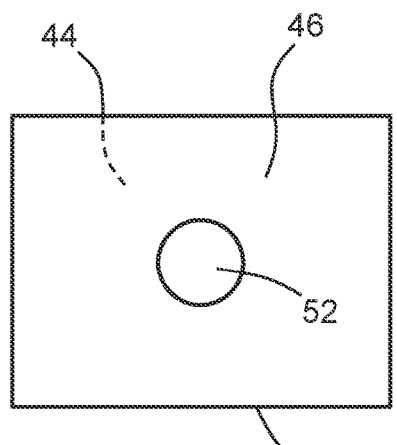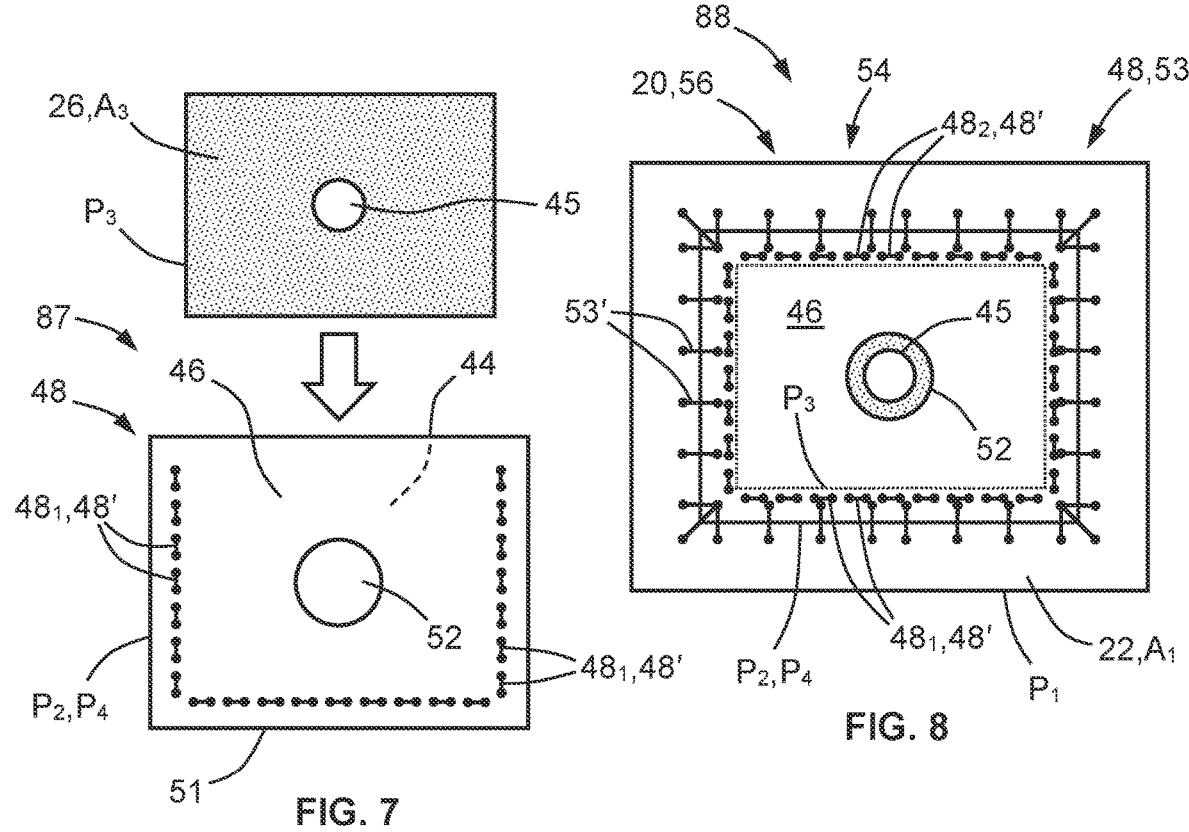
FIG. 5
FIG. 6
FIG. 7
FIG. 8

REINFORCED COMPOSITE ASSEMBLIES AND METHODS OF MANUFACTURING THE SAME

INTRODUCTION

This disclosure relates generally to reinforced composite assemblies and to methods of manufacturing reinforced composite assemblies.

Composite materials are often used in applications where high strength and low weight are desired, such as in structural components for automotive applications. While various composite materials may be used, one of the most common is carbon fiber, which is often woven into a single-layer or multi-layer mesh or mat and then saturated or infused with resin, forming a preform. Such preforms are typically rather pliable and thus may be draped or arranged in a mold cavity, with a mold plug being used to press against the preform and the mold cavity in order to urge the preform into a desired shape. Heat may then be applied to the mold for some time in order to cure the resin and set the preform in the desired shape.

Sometimes metallic brackets, plates and other inserts are added to one or more areas of a preform before resin injection in order to provide added reinforcement to those areas. For example, such added hardware may be made of steel, aluminum or other metals. However, because of the high electrical conductivity of carbon fiber, galvanic corrosion may occur at the interfaces between the carbon fiber and the metal hardware.

SUMMARY

According to one embodiment, a reinforced composite assembly includes a first sheet made of carbon fiber and having a first perimeter, a second sheet made of a non-carbon fiber material and having a second perimeter, wherein the second sheet is disposed atop the first sheet within the first perimeter, and a metallic plate having a third perimeter, wherein the metallic plate is disposed atop the second sheet within the second perimeter. The metallic plate has a plurality of holes formed therein about a perimeter of the metallic plate and defining a plurality of respective bridge portions between each of the holes and an adjacent outer edge of the metallic plate, and/or a plurality of extensions extending outward from a main portion of the metallic plate. The reinforced composite assembly also includes a first arrangement of thread stitching securing each of the bridge portions and extensions to the second sheet or to the first and second sheets.

Each of the plurality of extensions may be shaped as one of a T-shape, an L-shape, a U-shape having first and second ends wherein each of the first and second ends is contiguous with the main portion, a key head shape having a straight portion extending outward from the main portion and terminating in a closed loop portion, and a tab having one or more through-holes therein. Each of the holes may be shaped as one of a circular hole, an ellipsoidal hole, a square hole, a rounded straight slot, and a rectangular slot. The metallic plate may include at least one aperture therethrough located inward from the plurality of holes.

The reinforced composite assembly may further include a metallic member having a first portion thereof attached to the metallic plate and a second portion thereof extending away from the metallic plate, and a second arrangement of thread stitching may secure the second sheet to the first sheet. In the reinforced composite assembly, the first sheet may have a first area, the second sheet may have a second area smaller than the first area, and the metallic plate may have a third area smaller than the second area.

According to another embodiment, a method of manufacturing a reinforced composite assembly includes: (i) disposing a metallic plate having a third perimeter onto a second sheet made of a non-carbon fiber material and having a second perimeter, wherein the metallic plate is disposed within the second perimeter and has a plurality of holes formed therein about the third perimeter and defining a plurality of respective bridge portions between each of the holes and an adjacent outer edge of the metallic plate and/or a plurality of extensions extending outward from a main portion of the metallic plate; (ii) securing each of the bridge portions and extensions to the second sheet using a first arrangement of thread stitching, thereby producing a metallic plate-second sheet sub-assembly; (iii) placing the metallic plate-second sheet sub-assembly onto a first sheet made of carbon fiber and having a first perimeter, wherein the metallic plate-second sheet sub-assembly is disposed within the first perimeter and the second sheet separates the metallic plate from the first sheet; and (iv) fastening the second sheet to the first sheet using a second arrangement of thread stitching, thereby producing a reinforced preform assembly.

The method may further include: (v) setting the reinforced preform assembly into a mold cavity; (vi) closing a mold plug against the mold cavity to form a closed mold; (vii) injecting a resin into the closed mold so as to saturate at least a selected portion of the reinforced preform assembly with the resin, thereby creating a saturated reinforced preform assembly; (viii) opening the closed mold by separating the mold plug from the mold cavity so as to expose the saturated reinforced preform assembly; and (ix) removing the saturated reinforced preform assembly from the mold cavity. Additionally, the method may also include: (x) applying heat to the saturated reinforced preform assembly while in the closed mold until a predetermined level of cure of the resin is produced.

The mold cavity may include a guide pin extending upward from a mold surface and the metallic plate may include an aperture therethrough configured for mating with the guide pin. A respective plug seal may be disposed in at least one of the mold cavity and the mold plug, wherein each respective plug seal may be configured to be biased against a tapped hole within a tubular member attached to the metallic plate when the mold is closed. A resin seal may be disposed between the mold cavity and the reinforced preform assembly and around an aperture formed in the metallic plate when the reinforced preform assembly is positioned into the mold cavity. In this method, the first sheet may have a first area, the second sheet may have a second area smaller than the first area, and the metallic plate may have a third area smaller than the second area.

According to yet another embodiment, a reinforced composite assembly includes: a first sheet made of carbon fiber and having a first perimeter; a first layer of non-carbon fiber material having a second perimeter, wherein the first layer is disposed atop the first sheet within the first perimeter; a metallic plate having a third perimeter, wherein the metallic plate is disposed atop the first layer within the second perimeter; a second layer of non-carbon fiber material having a fourth perimeter, wherein the second layer is disposed atop the metallic plate such that the metallic plate is disposed within the fourth perimeter; and a first set of thread stitching securing together the first and second layers about the third perimeter.

The first set of thread stitching may further secure the first sheet with the first and second layers, and the first and second layers may be formed from a single sheet of non-carbon fiber material folded so as to dispose the first and second layers in facing relationship with each other. The first sheet may have a first area, the first layer may have a second area smaller than the first area, and the metallic plate may have a third area smaller than the second area. The metallic plate and the second layer may include respective first and second apertures therethrough, wherein the first and second apertures overlap with each other such that an entirety of the first aperture projects through the second aperture. The reinforced composite assembly may further include a second set of thread stitching securing together at least one of the first and second layers with the first sheet about the perimeter of the metallic plate.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIGS. 5-8 are schematic plan views of a sequence of steps for producing a pocketed metallic plate sub-assembly according to the second configuration.

Note that some of the drawings herein are presented in multiple related views, with the related views sharing a common Arabic numeral portion of the figure number and each individual view having its own unique "alphabetic" portion of the figure number. For example, FIGS. 22A-D are schematic elevation views representing a first sequence of steps for manufacturing a reinforced composite assembly according to the first configuration; these views share the same Arabic numeral (i.e., 22), but each individual view has its own unique "alphabetic" designation (i.e., A, B, C or D). When drawings are numbered in this way, reference may be made herein to the Arabic number alone to refer collectively to all the associated "alphabetics"; thus, "FIG. 22" refers to FIGS. 22A-D collectively. Likewise, "FIG. 23" refers to FIGS. 23A-D collectively, and so on.

DETAILED DESCRIPTION

Figure 1:
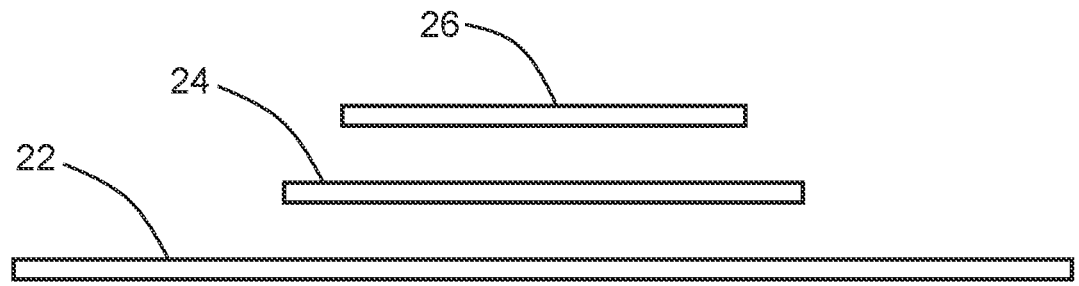
FIG. 1 is a schematic exploded elevation view of a set of selected components of a reinforced composite assembly according to a first configuration.

Referring now to the drawings, wherein like numerals indicate like parts in the several views, a variety of configurations and embodiments of a reinforced composite assembly 20, and various methods 100, 200, 300, 400, 500 for manufacturing the reinforced composite assembly 20, are shown and described herein. Note that certain reference numerals in the drawings have subscripts, such as the extensions $34_T$, $34_L$, $34_U$, $34_K$ and $34_B$ of FIGS. 11-16 which illustrate various extension shapes. Subscripts are used in the drawings and in the present description to refer to individual elements (such as the aforementioned extensions/extension shapes), while the use of reference numerals without subscripts may refer to the collective group of such elements and/or to a singular but generic one of such elements. Thus, reference numeral $34_T$ refers to a specific (T-shaped) extension/extension shape, while reference numeral 34 (without the subscript) may refer to all the extensions/extension shapes, the group of extensions/extension shapes, or a singular but generic extension/extension shape (i.e., any extension/extension shape).

Figure 2:
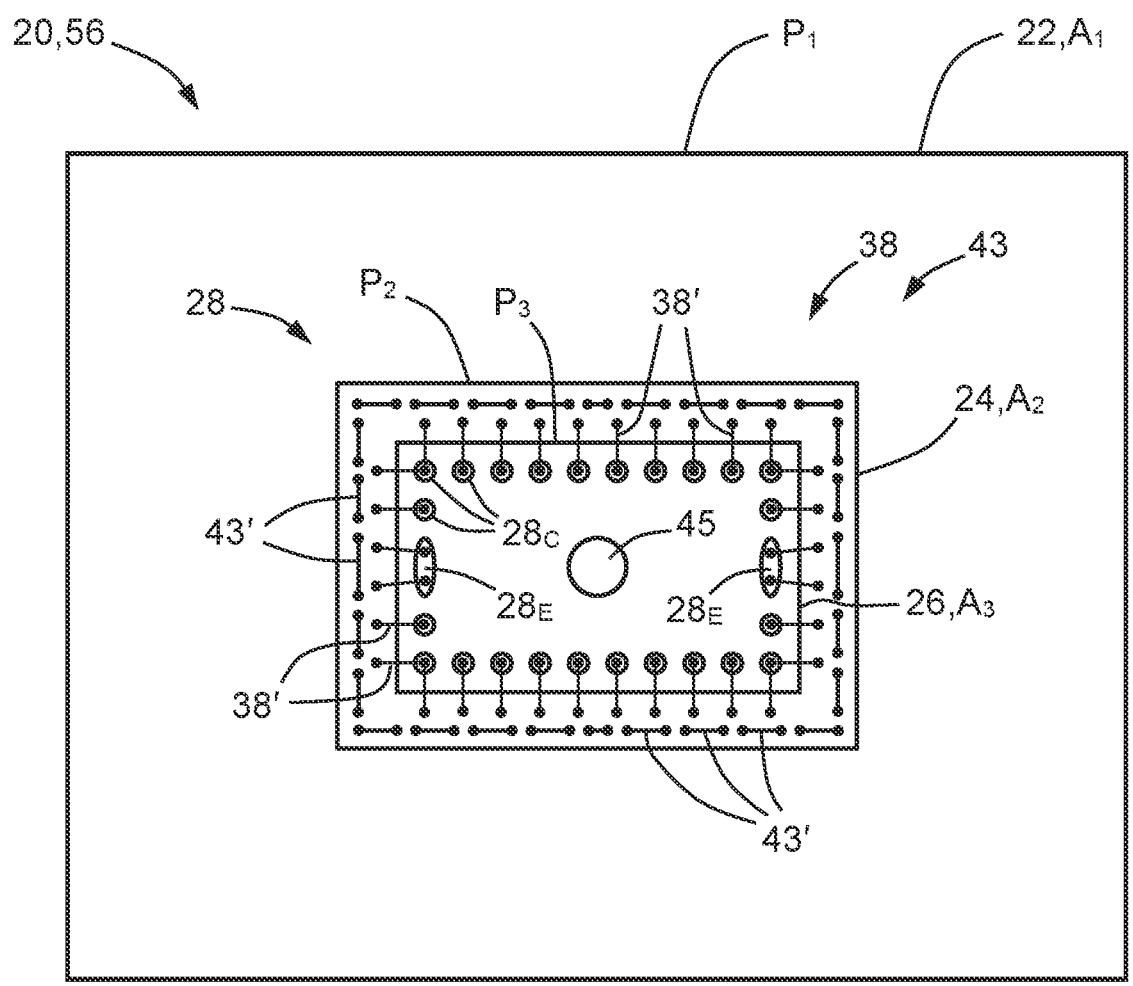
FIG. 2 is a schematic plan view of one embodiment of a reinforced composite assembly according to the first configuration.

FIG. 1 shows a schematic exploded elevation view of a set of selected components used to produce a reinforced composite assembly 20 according to a first configuration, and FIG. 2 shows a schematic plan view of one embodiment of a completed reinforced composite assembly 20 according to the first configuration. In this first configuration, the reinforced composite assembly 20 includes: a first sheet 22 made of carbon fiber and having a first area $A_1$ and a first perimeter $P_1$; a second sheet 24 made of a non-carbon fiber material and having a second area $A_2$ and a second perimeter $P_2$, wherein the second sheet 24 is disposed atop (i.e., on top of) the first sheet 22 and within the first perimeter $P_1$; and a metallic plate 26 having a third area $A_3$ and a third perimeter $P_3$, wherein the metallic plate 26 is disposed atop the second sheet 24 and within the second perimeter $P_2$. In this arrangement, the second sheet 24 separates the metallic plate 26 from the first sheet 22, thus preventing contact between the metal of the metallic plate 26 and the carbon fiber material of the first sheet 22. This separation between the metal and carbon fiber material serves to prevent the abovementioned galvanic corrosion issues.

In the present disclosure, the metallic plate 26 may have either of two configurations, thus also providing two respective configurations of the reinforced composite assembly 20 as well. In the first configuration, the metallic plate 26 has a plurality of holes 28 formed therein about a periphery or perimeter $P_3$ of the metallic plate 26 (as illustrated in FIGS. 2, 4, 9 and 17), and/or a plurality of extensions 34 extending outward from a main portion 36 of the metallic plate 26 (as illustrated in FIGS. 10-16). However, in the second configuration (discussed in further detail below), the metallic plate 26 does not have a plurality of holes 28 formed therein about a perimeter $P_3$ thereof, nor does it have a plurality of extensions 34 extending outward from the main portion 36 thereof. (Note that as used herein, the use of the word "about" in connection with a given perimeter means one or more of along the perimeter, around the perimeter, close to the perimeter, close to and just outside of the perimeter, along the length of the perimeter, coextensive with the perimeter, and along/around the full ambit of the perimeter, depending on the context, and as may be illustrated by one or more of the drawings.)

Figure 9:
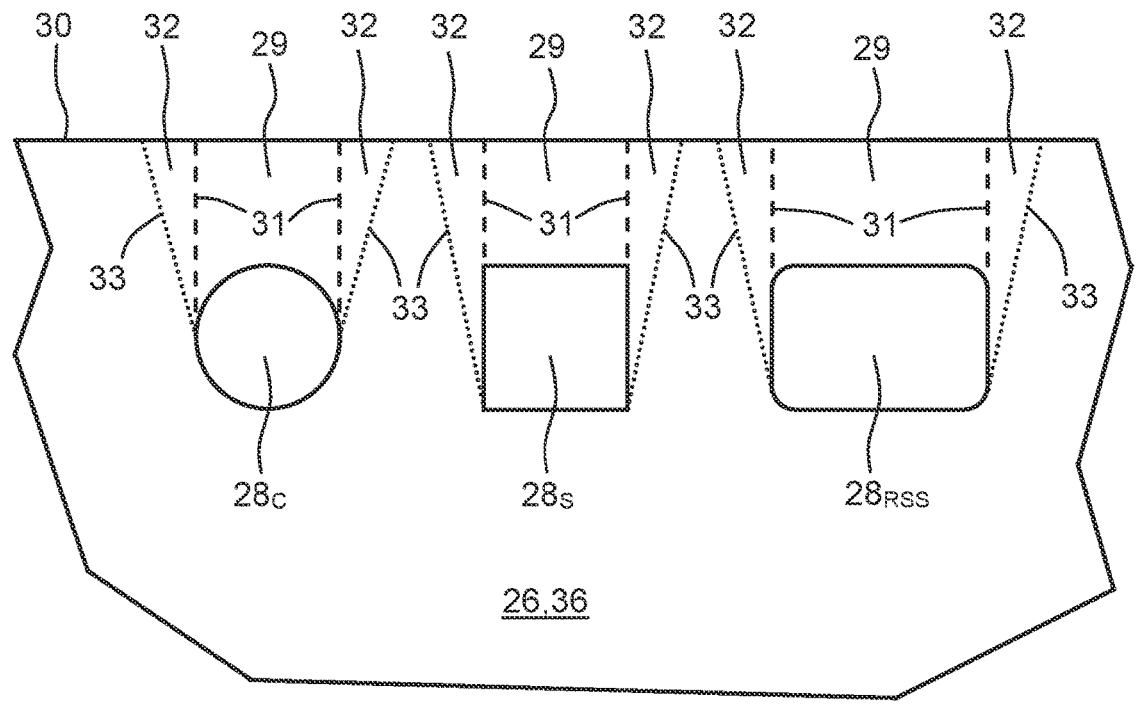
FIG. 9 is a schematic close-up plan view of a portion of a metallic plate showing various hole configurations according to the first configuration.

If the metallic plate 26 is of the first configuration and has a plurality of peripheral holes 28, the holes 28 define a plurality of respective bridge portions 29 between each of the holes 28 and an adjacent outer edge 30 of the metallic plate, as illustrated in FIG. 9. Here, a schematic close-up view is shown of a portion of a metallic plate 26 having various hole configurations, such as a circular hole $28_C$, a square hole $28_S$ and a rounded straight slot $28_{RSS}$. In the hole configurations illustrated in FIG. 9, each bridge portion 29 is shown bordered by dashed lines 31 on the left and right sides of the associated bridge portion 29, by the outer edge 30 of the metallic plate 26 at the top of the bridge portion 29, and by the edge of the adjacent hole 28 at the bottom of the bridge portion 29. The dashed lines 31 associated with each bridge portion 29 are shown as extending from the left and right sides of the associated hole 28 and extending perpendicular to the outer edge 30. Each bridge portion 29 may also include its respective adjacent portions 32, which are on either side of each associated hole 28. As shown in FIG. 9, each adjacent portion 32 lies between a respective dashed line 31, a neighboring dotted line 33 extending from the side of the hole 28 and angling outward from the hole 28, and the outer edge 30 of the metallic plate 26. (For some hole shapes like the square hole $28_S$ and the rounded straight slot $28_{RSS}$, one side of each associated adjacent portion 32 may be bounded by a combination of the dashed line 31 and the side of the hole 28 from which the dashed line 31 extends.)

Figure 14:
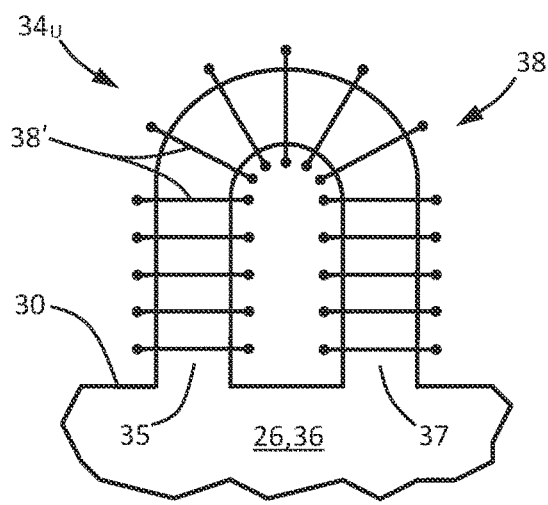
Figure 15:
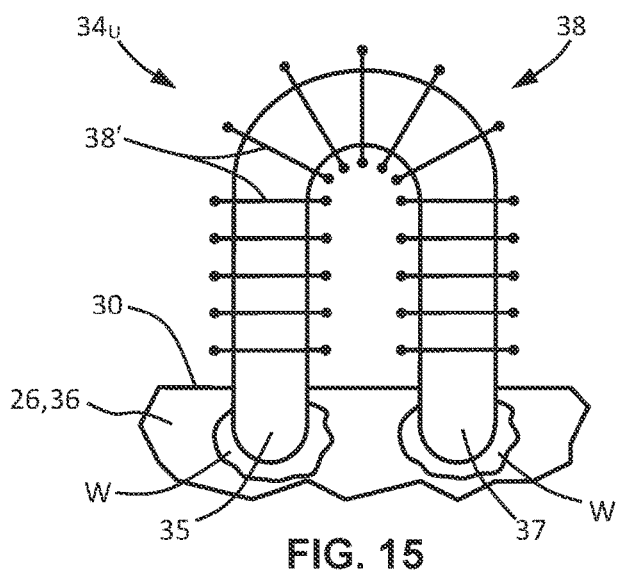
Figure 16:
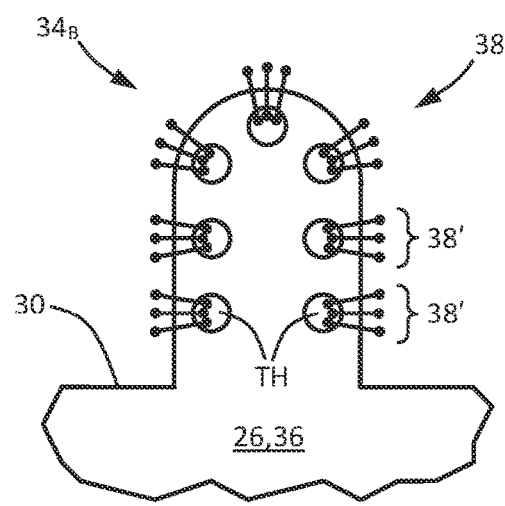

If the metallic plate 26 is of the first configuration and has a plurality of extensions 34 extending outward from the main portion 36 of the metallic plate 26, as shown in FIGS. 10-16, the extensions 34 may be provided in a variety of different shapes. For example, each extension 34 may have a T-shape $34_T$, an L-shape $34_L$, a U-shape $34_U$ having first and second ends 35, 37 wherein each of the first and second ends 35, 37 is contiguous with and extends outward from the main portion 36, a key head shape $34_K$ having a straight portion $39_S$ extending outward from the main portion 36 and terminating in a closed loop portion $39_{CL}$, or a tab shape $34_B$ extending outward from the main portion 36 and having one or more through-holes TH therein. One version of a U-shaped extension $34_U$ is shown in FIG. 14, where both the first and second ends 35, 37 are formed contiguous with the main portion 36 (such as being formed in this way by a stamping process), and another version of a U-shaped extension $34_U$ is shown in FIG. 15, where each of the first and second ends 35, 37 is welded to the main portion 36 via welds W. In the case of FIG. 15, the U-shaped extension $34_U$ may be made of the same metal as the main portion 36 of the metallic plate 26, or it may be made of a different metal that is weldable to the main portion 36. Optionally, the U-shaped extension $34_U$ of FIG. 15 may take the form of a wire braid or a flat U-shaped stamping.

In the first configuration of the metallic plate 26, the holes 28 and/or extensions 34 serve as features which may be used to secure or anchor the metallic plate 26 to the surface(s) onto which the metallic plate 26 is placed. This securing or anchoring may be accomplished using "thread stitching", which is a collection, array, arrangement or set of stitches sewn using thread or filaments. These stitches may be sewn using a needle, such as with using an industrial sewing machine that may be operated manually or using computer numerical control (CNC) or other automated processes.

Figure 4:
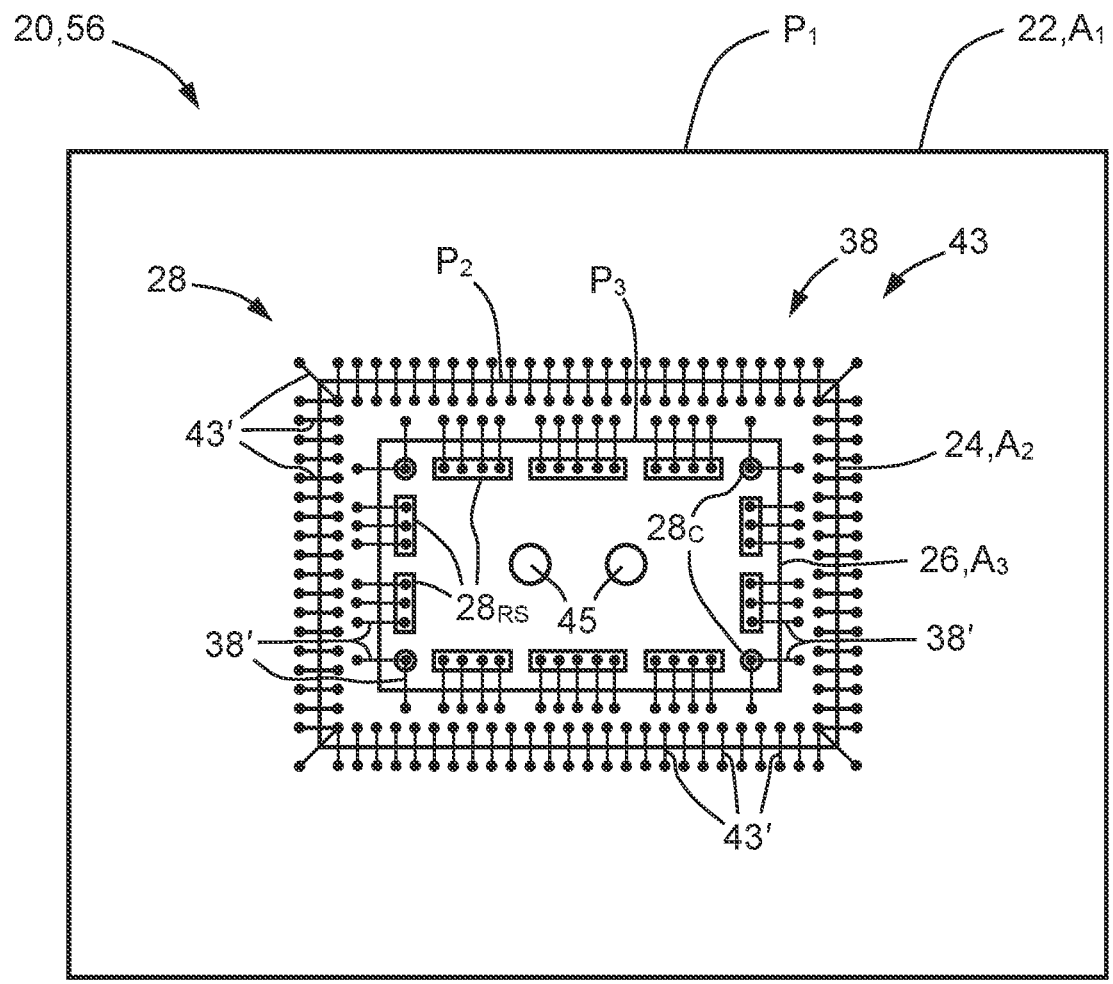
FIG. 4 is a schematic plan view of another embodiment of a reinforced composite assembly according to the first configuration.

For example, FIGS. 2 and 4 show schematic plan views of two different embodiments of a reinforced composite assembly 20 utilizing the first configuration of the metallic plate 26. Specifically, FIG. 2 shows a metallic plate 26 having a plurality of circular holes $28_C$ and ellipsoidal holes $28_E$ about the perimeter $P_3$ of the plate 26, and FIG. 4 shows a plurality of rectangular slots $28_{RS}$ about the perimeter $P_3$. In such embodiments, the holes 28 are fastened to the underlying second sheet 24 of non-carbon fiber material by a first arrangement of thread stitching 38. Note that while the drawings appear to show one or two individual stitches or strands of thread 38' fastening each circular hole $28_C$, two individual stitches 38' fastening each ellipsoidal hole $28_E$, and two, three or four individual stitches 38' fastening each rectangular slot $28_{RS}$, this is merely for illustration purposes, as each hole 28 may have any number of such individual stitches 38' associated therewith.

Figure 10:
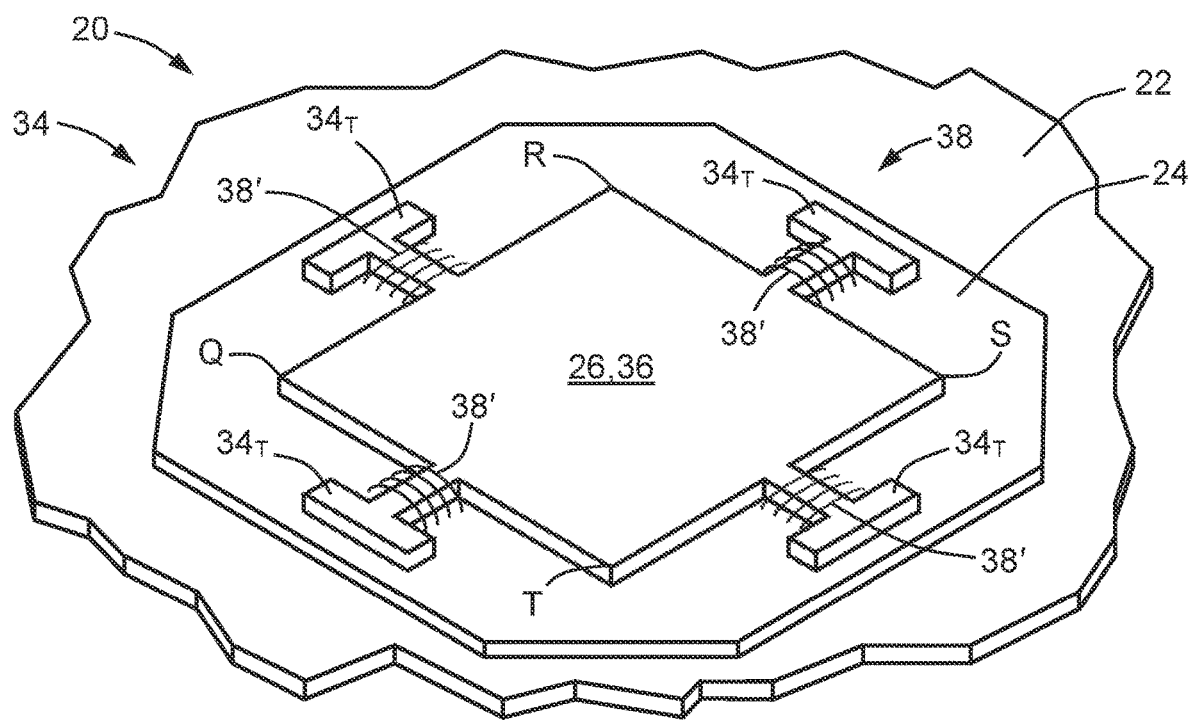
FIG. 10 is a schematic perspective view of a metallic plate having T-shaped extensions according to the first configuration.
Figure 11:
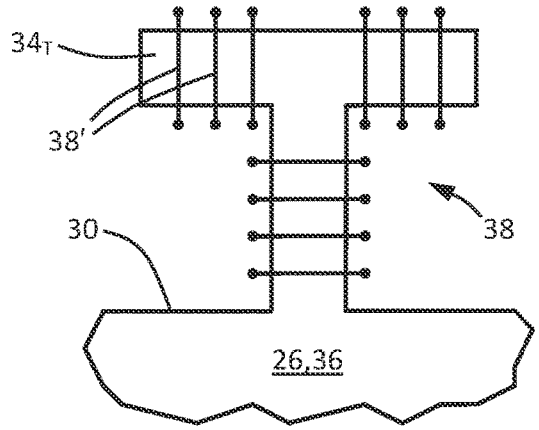
FIGS. 11-16 are schematic isolated plan views of various extension shapes according to the first configuration.
Figure 12:
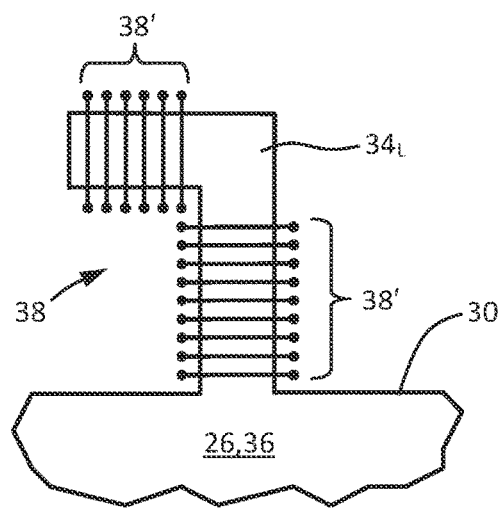
Figure 13:
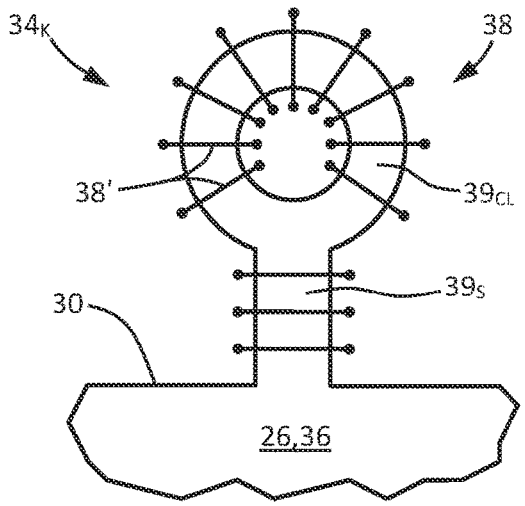

Similarly, FIG. 10 shows a schematic perspective view of a metallic plate 26 having T-shaped extensions $34_T$ that are fastened atop a second sheet 24 of non-carbon fiber material by a first arrangement of thread stitching 38. Note that while the drawing appears to show four individual stitches 38' fastening each T-shaped extension $34_T$, this is merely for illustration purposes, as each extension 34 may have any number of such individual stitches 38'. As another example, FIG. 11 shows a T-shaped extension $34_T$ having four individual stitches 38' across the main leg of the extension $34_T$ which extends outward from the main portion 36 of the metallic plate 26, and three individual stitches 38' across each of the two legs extending transverse to the main leg, but any number of stitches 38' may be arranged across the main leg and each transverse leg.

Each individual stitch 38' appears schematically in the drawings as a single line (also shown in some views as having a circular endpoint on each of the two ends of the line), but in actual practice each individual stitch 38' may comprise a collection of repeated stitches, which is a common sewing practice. Each stitch 38' extends across a respective bridge portion 29 or extension 34, and extends through the underlying sheet(s) or layer(s) on either side of the bridge portion 29 or extension 34. Each of these stitches 38' may stand as separate from its neighboring stitches 38', or (as is the more common sewing practice) each stitch 38' may be attached with one or more neighboring stitches 38', thus forming a continuous array or daisy-chain of stitches 38' made from a single continuous length of thread or filament. Using customary sewing techniques, the stitches 38' attach the bridge portions 29 and/or extensions 34 to the underlying sheet(s) or layer(s). Thus, in the first configuration of the metallic plate 26 which utilizes holes 28 and/or extensions 34, a first arrangement of thread stitching 38 secures each of the bridge portions 29 and extensions 34 to the second sheet 24 or to the first and second sheets 22, 24. (That is, the stitches 38' may extend through only the second sheet 24, or they may extend through both the first and second sheets 22, 24.)

Figure 18:
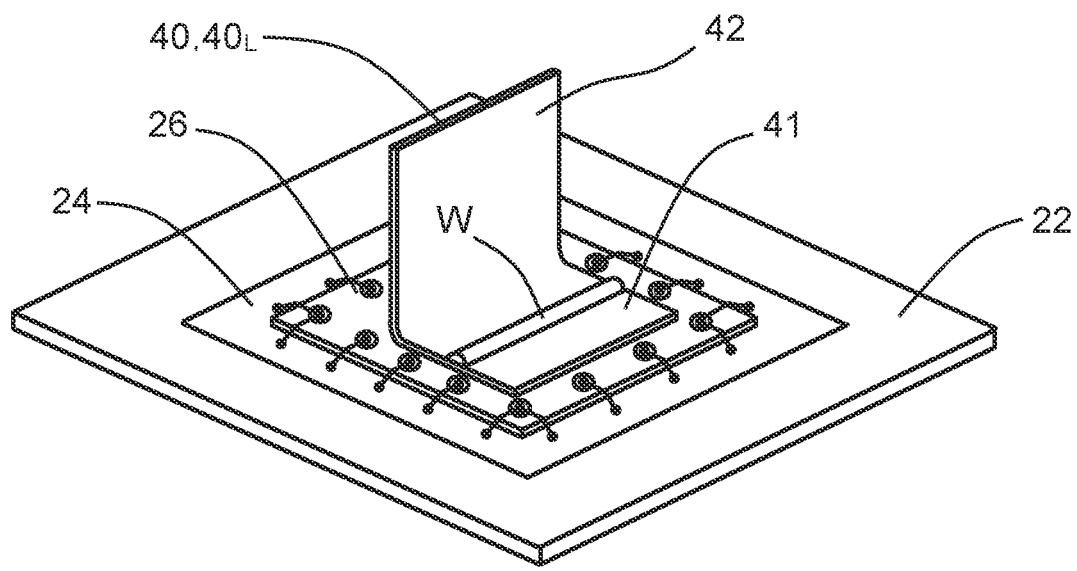
FIGS. 18-19 are schematic perspective views of an optional metallic member having an L-bracket shape and a tubular shape, respectively, according to the first configuration.
Figure 19:
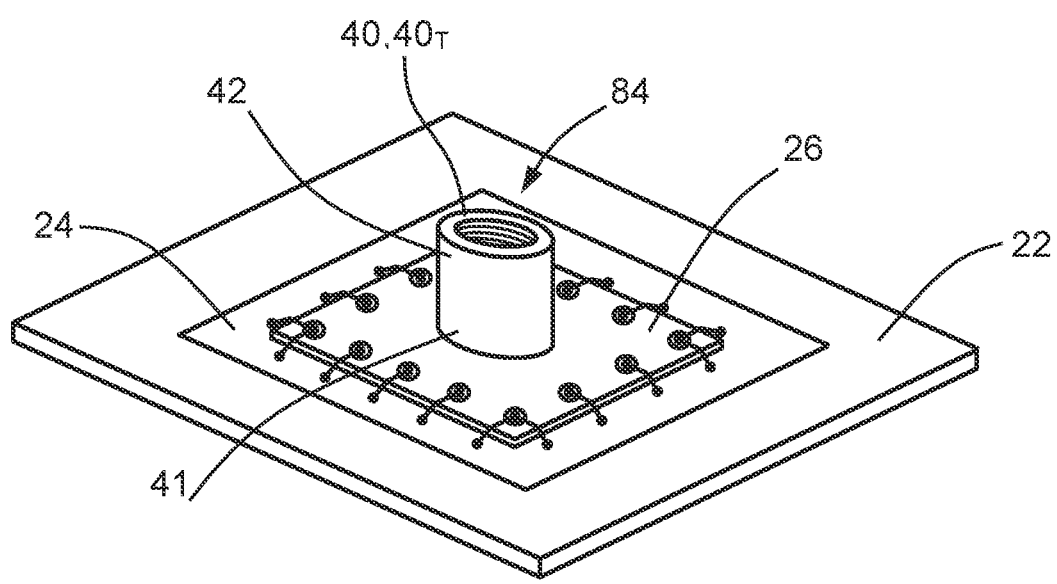

As shown in FIGS. 18-19, the first configuration of the reinforced composite assembly 20 may further include a metallic member 40 having a first portion 41 thereof attached to the metallic plate 26 and a second portion 42 thereof extending away from the metallic plate 26. In FIG. 18, the metallic member 40 is an L-shaped plate $40_L$ whose first portion 41 is welded onto the exposed surface of the metallic plate 26 via a weld W, with the second portion 42 extending perpendicular to the metallic plate 26. And in FIG. 19, the metallic member 40 is a tube or tubular member $40_T$ having a tapped hole 84 (i.e., internal threads), with the first portion 41 attached to the metallic plate 26 and the second portion 42 extending perpendicular to the metallic plate 26.

The first configuration of the reinforced composite assembly 20 may also include at least one aperture 45 through the metallic plate 26, with the aperture(s) 45 being located inward from the plurality of peripheral holes 28 (e.g., nearer to the center of the metallic plate 26 than to the edge 30). These one or more apertures 45 may be used to help locate and orient the reinforced composite assembly 20 within a mold, as further discussed below. Additionally, the second sheet 24 may be disposed within the first perimeter $P_1$ of the first sheet 22, and the metallic plate 26 may be disposed within the second perimeter $P_2$ of the second sheet 24. Note that as used herein, when an object is described as being "within" a given perimeter, each of the edges of that object (including any portion of each edge) may lie "inside" of the given perimeter, or may lie directly "upon" the given perimeter, but may not extend beyond or "outside" of the given perimeter. For example, the metallic plate 26 may have a third perimeter $P_3$ that is exactly the same shape and size as the second perimeter $P_2$ of the second sheet 24; in this case, the metallic plate 26 may be disposed or situated on top of the second sheet 24 such that their respective third and second perimeters $P_3$, $P_2$ are coextensive with each other. Moreover, in some embodiments, the second area $A_2$ may be smaller than the first area $A_1$, and the third area $A_3$ may be smaller than the second area $A_2$.

As illustrated in FIGS. 2 and 4, a second arrangement of thread stitching 43 may be used to secure the second sheet 24 to the first sheet 22. As with the first arrangement of thread stitching 38 discussed above, the second arrangement of thread stitching 43 is a collection, array or arrangement of individual stitches 43' sewn using thread or filaments. Each individual stitch 43' appears schematically in the drawings as a single line (also shown in some views as having a circular endpoint on each of the two ends of the line), but in actual practice each individual stitch 43' may comprise a collection of repeated stitches. Each stitch 43' extends through the first sheet 22 and the second sheet 24, thus attaching and securing the two sheets 22, 24 together. Each of these stitches 43' may stand as separate from its neighboring stitches 43', or each stitch 43' may be attached with one or more neighboring stitches 43', thus forming a continuous array or daisy-chain of stitches 43' made from a single continuous length of thread or filament.

The thread or filament used in the first and second arrangements of thread stitching 38, 43 may be made from a variety of materials, including at least one of fiberglass, carbon filaments, nylon and polyester. The first and second arrangements of thread stitching 38, 43 may be made from two respective materials that are different from each other, or they may be made of the same material. With regard to other materials that may be used in the reinforced composite assembly 20, the non-carbon fiber material used in the second sheet 24 may be at least one of fiberglass, aramid, nylon, polyester and polytetrafluoroethylene, and the metallic plate 26 may be made of at least one of iron, steel, aluminum, titanium and molybdenum.

Turning now to FIGS. 3 and 5-8, the second configuration of the reinforced composite assembly is shown. Note that unlike the first configuration, the second configuration does not have a plurality of holes 28 or extensions 34 used for securing the metallic plate 26 atop its underlying layer(s). Instead, in the second configuration the metallic plate 26 is captured (i.e., enveloped, constrained and/or held) within a "closed pocket" 88 formed around the metallic plate 26 by first and second layers 44, 46 of non-carbon fiber material sewn together (around most or all of the perimeter $P_3$ of the metallic plate 26) by a first set of thread stitching 48.

Figure 3:
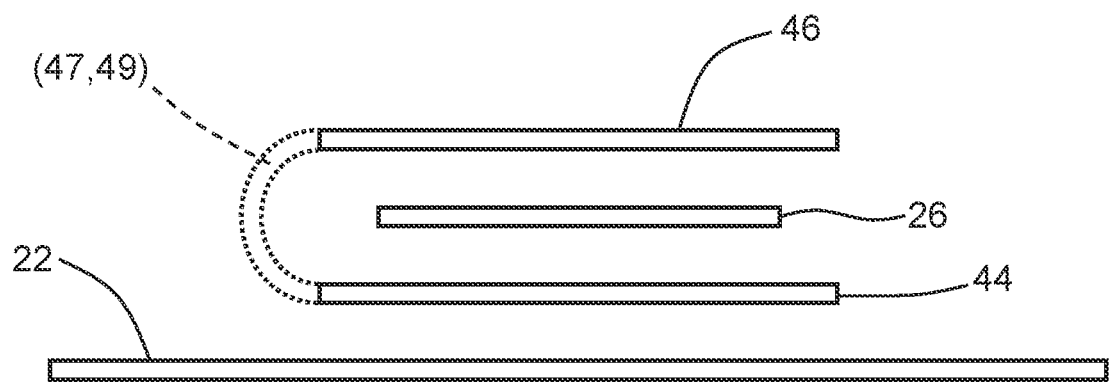
FIG. 3 is a schematic exploded elevation view of another set of selected components of a reinforced composite assembly according to a second configuration.

FIG. 3 shows a schematic exploded elevation view of a set of selected components used to produce the second configuration of the reinforced composite assembly 20. In this second configuration, the reinforced composite assembly 20 includes: a first sheet 22 made of carbon fiber and having a first area $A_1$ and a first perimeter $P_1$; a first layer 44 of non-carbon fiber material having a second area $A_2$ and a second perimeter $P_2$, wherein the first layer 44 is disposed atop the first sheet 22 and within the first perimeter $P_1$; a metallic plate 26 having a third area $A_3$ and a third perimeter $P_3$, wherein the metallic plate 26 is disposed atop the first layer 44 and within the second perimeter $P_2$; and a second layer 46 of non-carbon fiber material having a fourth area $A_4$ and a fourth perimeter $P_4$, wherein the second layer 46 is disposed atop the metallic plate 26 such that the metallic plate 26 is disposed within the fourth perimeter $P_4$. In this configuration, the first layer 44 may be disposed within the first perimeter $P_1$, and the metallic plate 26 may be disposed within the second perimeter $P_2$ (and optionally within the fourth perimeter $P_4$ as well.) Additionally, in this configuration, the second area $A_2$ may be smaller than the first area $A_1$, the third area $A_3$ may be smaller than the second area $A_2$, and optionally the fourth area $A_4$ may be about the same as the second area $A_2$.

As illustrated in FIG. 8, the reinforced composite assembly 20 according to the second configuration further includes a first set of thread stitching 48 securing together the first and second layers 44, 46 about the perimeter $P_3$ of the metallic plate 26, thus forming a closed pocket 88 which surrounds and contains the metallic plate 26. (Note that the perimeter $P_3$ of the metallic plate 26 is shown in dotted lines in FIG. 8.) With the closed pocket 88 disposed on the first sheet 22, a second set of thread stitching 53 may be used to secure together at least one of the first and second layers 44, 46 with the first sheet 22 about the perimeter $P_3$ of the metallic plate 26. Alternatively, the first sheet 22, the first layer 44, the metallic plate 26 and the second layer 46 may be sandwiched together in the arrangement suggested by FIG. 3, and the first set of thread stitching 48 may be sewn through the first sheet 22, the first layer 44 and the second layer 46—about, around and along the perimeter $P_3$ of the metallic plate 26 (i.e., just outside the perimeter $P_3$)—thus capturing the metallic plate 26 within the closed pocket 88 formed by the first and second layers 44, 46 and the first set of thread stitching 48, and securing or attaching together the first sheet 22, the first layer 44 and the second layer 46.

FIGS. 5-7 illustrate a process which may be used for forming the reinforced composite assembly 20 according to the second configuration of FIG. 8. In FIG. 5, a single sheet 49 of non-carbon fiber material is folded along a line 50, creating a crease or fold 51 in the single sheet 49. In the arrangement shown, the crease 51 divides the single sheet 49 into two identical halves, with one half serving as the first layer 44 (having a second perimeter $P_2$ and a second area $A_2$) and the other half serving as the second layer 46 (having a fourth perimeter $P_4$ and a fourth area $A_4$). An optional second aperture 52 may be formed in the half serving as the second layer 46.

FIG. 6 shows the two halves folded onto each other along the crease 51 with the second layer 46 on top of the first layer 44 so as to dispose the first and second layers 44, 46 in facing relationship with each other. FIG. 7 shows a first set of thread stitching 48 which extends through both the first and second layers 44, 46 and binds the two layers 44, 46 together. (Note that the characteristics of the first and second arrangements of thread stitching 38, 43 and their related individual stitches 38', 43' discussed above likewise apply to the first and second sets of thread stitching 48, 53 and their individual stiches 48', 53' discussed here.) In FIG. 7, the first set of thread stitching 48 extends only around three of the four edges of the perimeters $P_2$, $P_4$; this set of stitching may be viewed as an initial portion $48_1$ of the first set of thread stitching 48, with the first and second layers 44, 46 and the initial portion $48_1$ of the thread stitching 48 forming an "open pocket" 87. As indicated by the arrow in FIG. 7, a metallic plate 26 may be inserted into the open pocket 87. Then, as illustrated in FIG. 8, the remaining edge of the perimeters $P_2$, $P_4$ may be sewn with a subsequent portion $48_2$ of the thread stitching 48, thus extending the first set of thread stitching 48 about or along the entire perimeter $P_3$ of the metallic plate 26, and capturing the metallic plate 26 within a closed pocket 88 formed by the first and second layers 44, 46 and the first set of thread stitching 48. Note that in the embodiment shown in FIG. 8, a first aperture 45 in the metallic plate 26 may be visible through the second aperture 52 formed in the second layer 46.

FIG. 3 shows a connecting portion 47 of a single sheet 49 of non-carbon fiber material, which connects the first and second layers 44, 46. However, note that this connecting portion 47 of a single sheet 49 is shown in dotted lines, with the associated reference numerals presented in parentheses and the lead line drawn as a dashed line; this is to indicate that the connecting portion 47 is optional. In other words, the first and second layers 44, 46 may be two separate layers or sheets of non-carbon fiber material, rather than two folded halves of a single sheet 49 of non-carbon fiber material. In arrangements where the first and second layers 44, 46 are two separate layers or sheets, they may be made of the same non-carbon fiber material as each other, or they may be made from two different non-carbon fiber materials. In any of the foregoing arrangements, the metallic plate 26 and the second layer 46 may include respective first and second apertures 45, 52 therethrough, wherein the first and second apertures 45, 52 overlap with each other such that an entirety of the first aperture 45 projects through (e.g., is visible through) the second aperture 52.

The description of the materials that may be used in the first configuration of the reinforced composite assembly 20 discussed above similarly applies to the materials that may be used in the second configuration. For example, the thread or filament used in the first and second sets of thread stitching 48, 53 may be made from a variety of materials, including at least one of fiberglass, carbon filaments, nylon and polyester. The first and second sets of thread stitching 48, 53 may be made from two respective materials that are different from each other, or they may be made of the same material. With regard to other materials that may be used in the second configuration of the reinforced composite assembly 20, the non-carbon fiber material used in the first and second layers 44, 46 may be at least one of fiberglass, aramid, nylon, polyester and polytetrafluoroethylene, and the metallic plate 26 may be made of at least one of iron, steel, aluminum, titanium and molybdenum.

Figure 17:
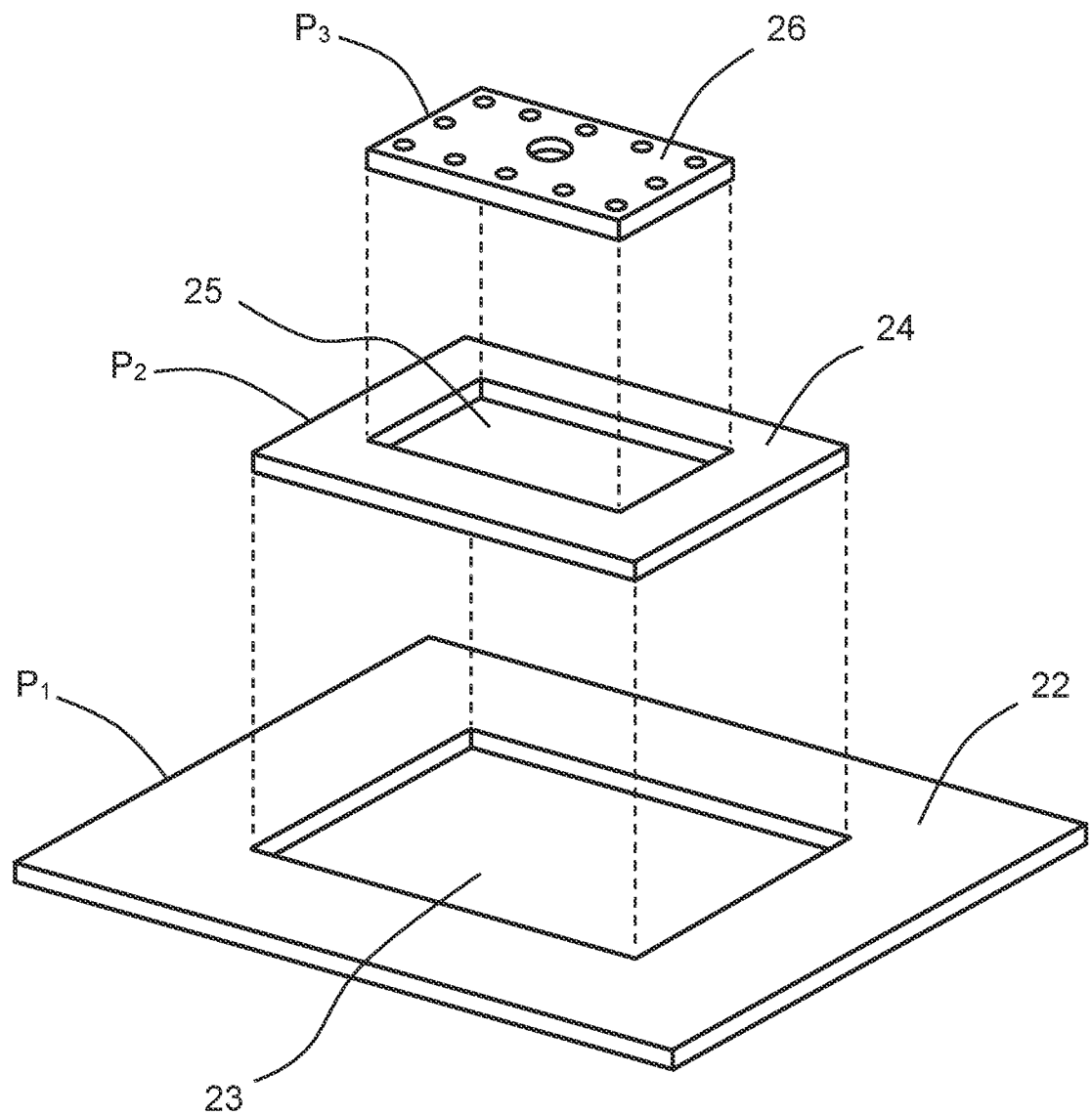
FIG. 17 is a schematic exploded perspective view of yet another set of selected components of a reinforced composite assembly according to the first configuration.
Figure 20:
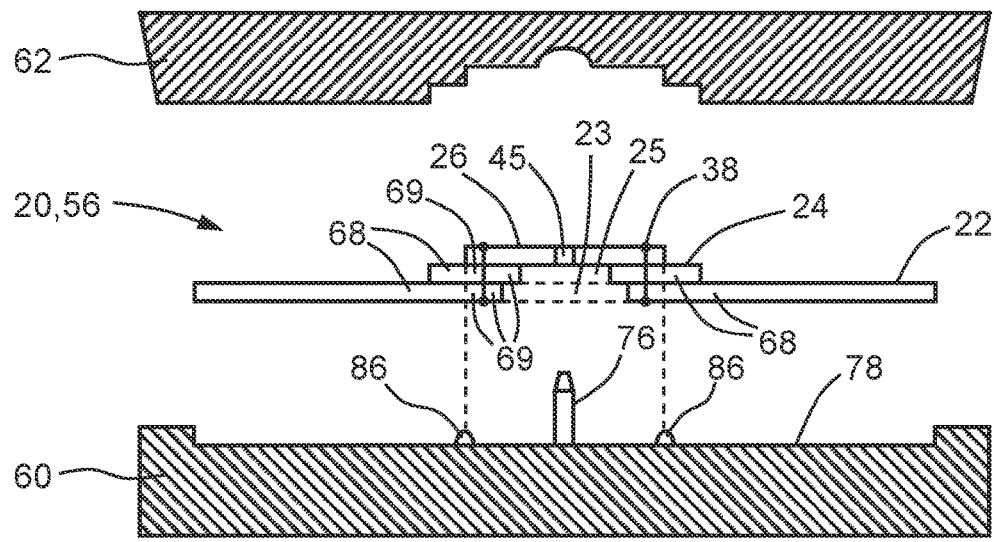
FIG. 20 is a schematic exploded perspective view of a reinforced preform assembly being inserted into an open mold.
Figure 21:
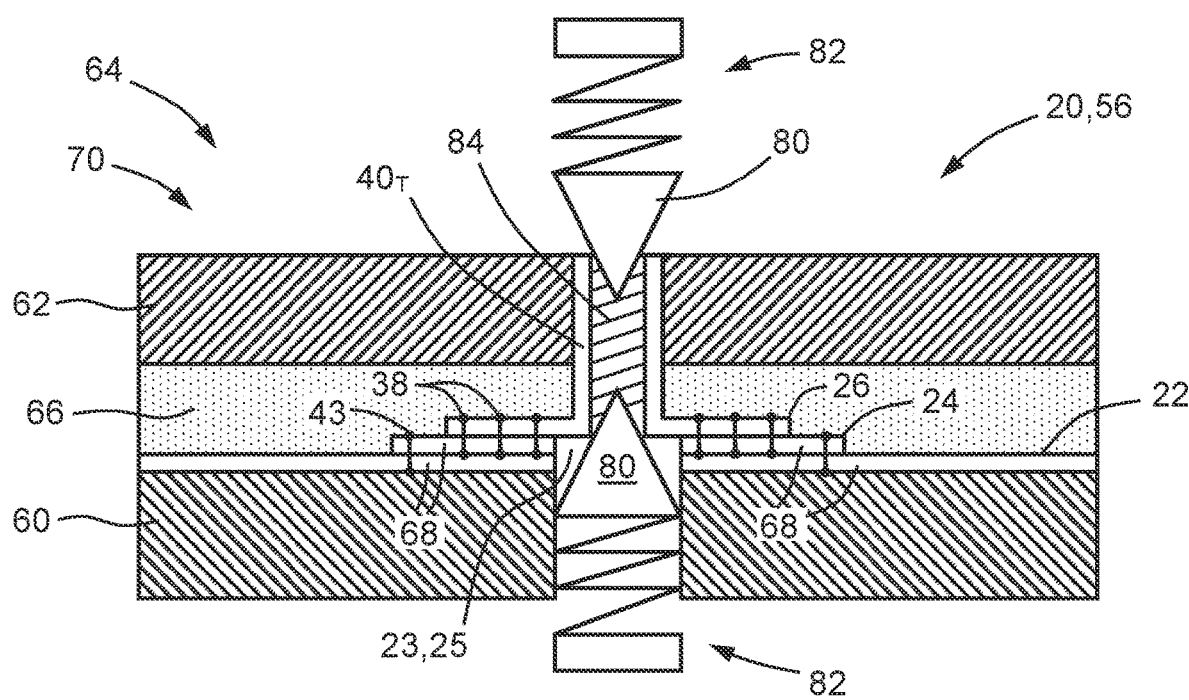
FIG. 21 is a schematic cross-sectional elevation view of a closed mold and a reinforced preform assembly.
Figure 22A:
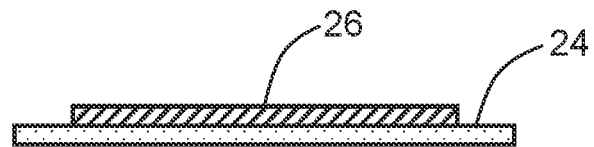
FIGS. 22A-D are schematic cross-sectional elevation views representing a first sequence of steps for manufacturing a reinforced composite assembly according to the first configuration.
Figure 22B:
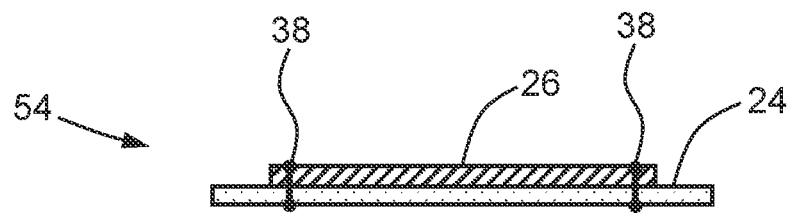
Figure 22C:
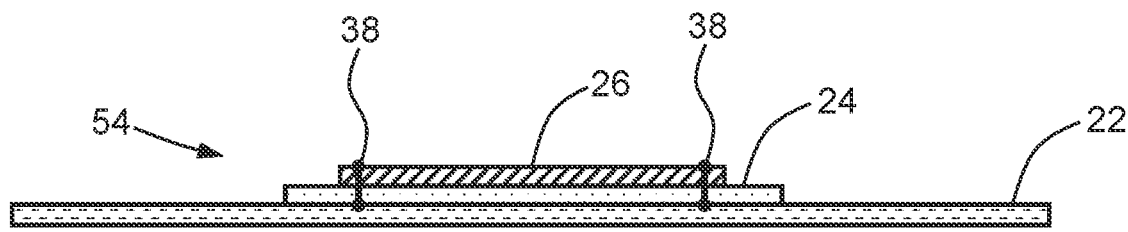
Figure 22D:
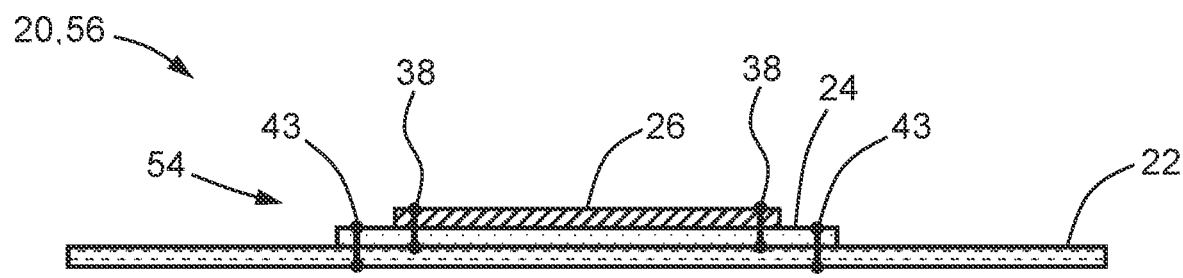
Figure 23A:
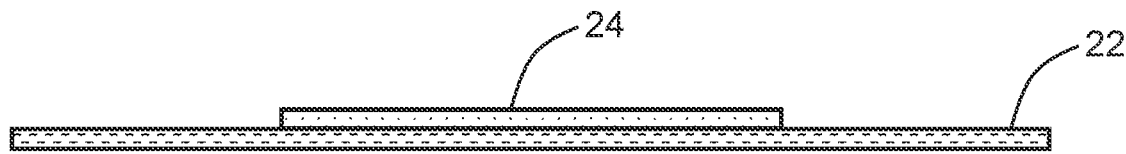
FIGS. 23A-D are schematic cross-sectional elevation views representing a second sequence of steps for manufacturing a reinforced composite assembly according to the first configuration.
Figure 23B:
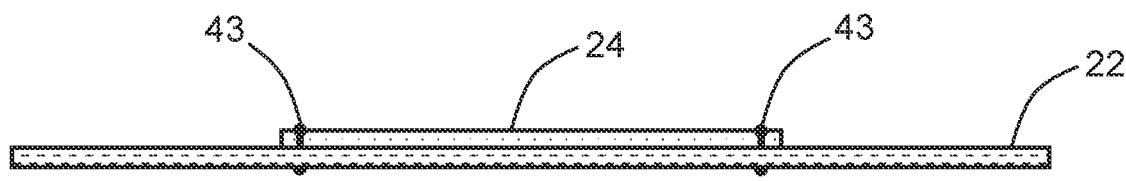
Figure 23C:
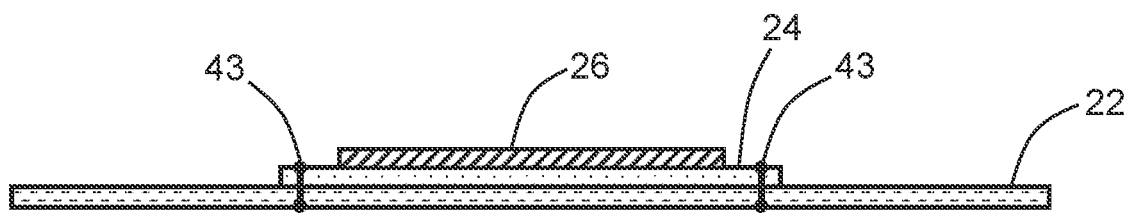
Figure 23D:
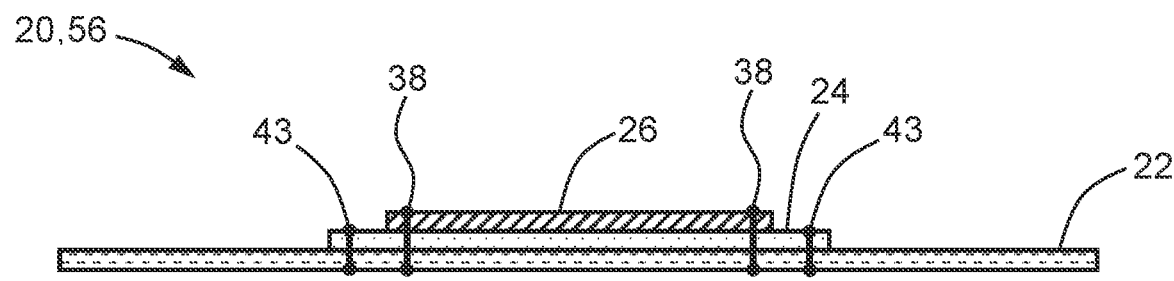

In either of the two configurations, the first sheet 22 of carbon fiber may be a continuous sheet, or it may have a window or cutout 23 formed therein, as illustrated in FIGS. 17, 20-21 and 26A-D. Additionally, in the first configuration, the second sheet 24 may have a window or cutout 25 formed therein (as shown in FIGS. 17 and 20-21); and in the second configuration, the first layer 44 may have a window or cutout 57 formed therein, with an optional second aperture 52 being formed in the second layer 46 (as shown in FIGS. 26A-D). In the first configuration, the windows or cutouts 23, 25 and the aperture 45 in the metallic plate 26 may all be concentrically or otherwise aligned with each other, and in the second configuration, the first aperture 45, the optional second aperture 52 and the window or cutout 57 may likewise all be concentrically or otherwise aligned with each other. These alignments may be useful for properly situating the reinforced composite assembly 20 when it is placed into a mold cavity 60 atop a guide pin 76 which mates with the aperture 45 in the metallic plate 26, as further discussed below.

Various methods of manufacturing the two configurations of the reinforced composite assembly 20 will now be discussed. To facilitate this discussion, the following table is presented which shows the figures (and selected reference numbers, in parentheses) that represent the structure and methods of manufacturing associated with the two configurations:

TABLE 1

Figures (and Reference Numbers) Associated with the First and Second Configurations

| | First Configuration: Metallic Plate 26 WITH Holes 28 and/or Extensions 34 | Second Configuration: Metallic Plate 26 WITHOUT Holes 28 and/or Extensions 34 |
|---|---|---|
| Reinforced Composite Assembly | FIGS. 1-2, 4, 9-19 (24; 38, 43) | FIGS. 3, 5-8 (44, 46; 48, 53) |

TABLE 1-continued

Figures (and Reference Numbers) Associated with the First and Second Configurations

| | First Configuration:<br>Metallic Plate 26 WITH<br>Holes 28 and/or Extensions 34 | Second Configuration:<br>Metallic Plate 26 WITHOUT<br>Holes 28 and/or Extensions 34 |
|---|---|---|
| Methods of Manufacturing a<br>Reinforced Composite Assembly | FIGS. 20-24, 27-29<br>(100, 200, 300) | FIGS. 25-26, 30-31<br>(400, 500) |

Note that while both configurations of the reinforced composite assembly 20 include a first sheet 22 and a metallic plate 26, the two configurations differ from one another in certain other aspects. For instance, the first configuration utilizes a second sheet 24 made of non-carbon fiber material, whereas the second configuration uses first and second layers 44, 46 of non-carbon fiber material. Additionally, the first configuration may utilize a first arrangement of thread stitching 38 or first and second arrangements of thread stitching 38, 43, while the second configuration uses a first set of thread stitching 48 or first and second sets of thread stitching 48, 53. Three methods (100, 200, 300) of manufacturing the first configuration are presented below, followed by two methods (400, 500) of manufacturing the second configuration. For the sake of convenience, these methods of manufacturing may be referred to as the first method 100, the second method 200, the third method 300, the fourth method 400, and the fifth method 500.

Figure 27:
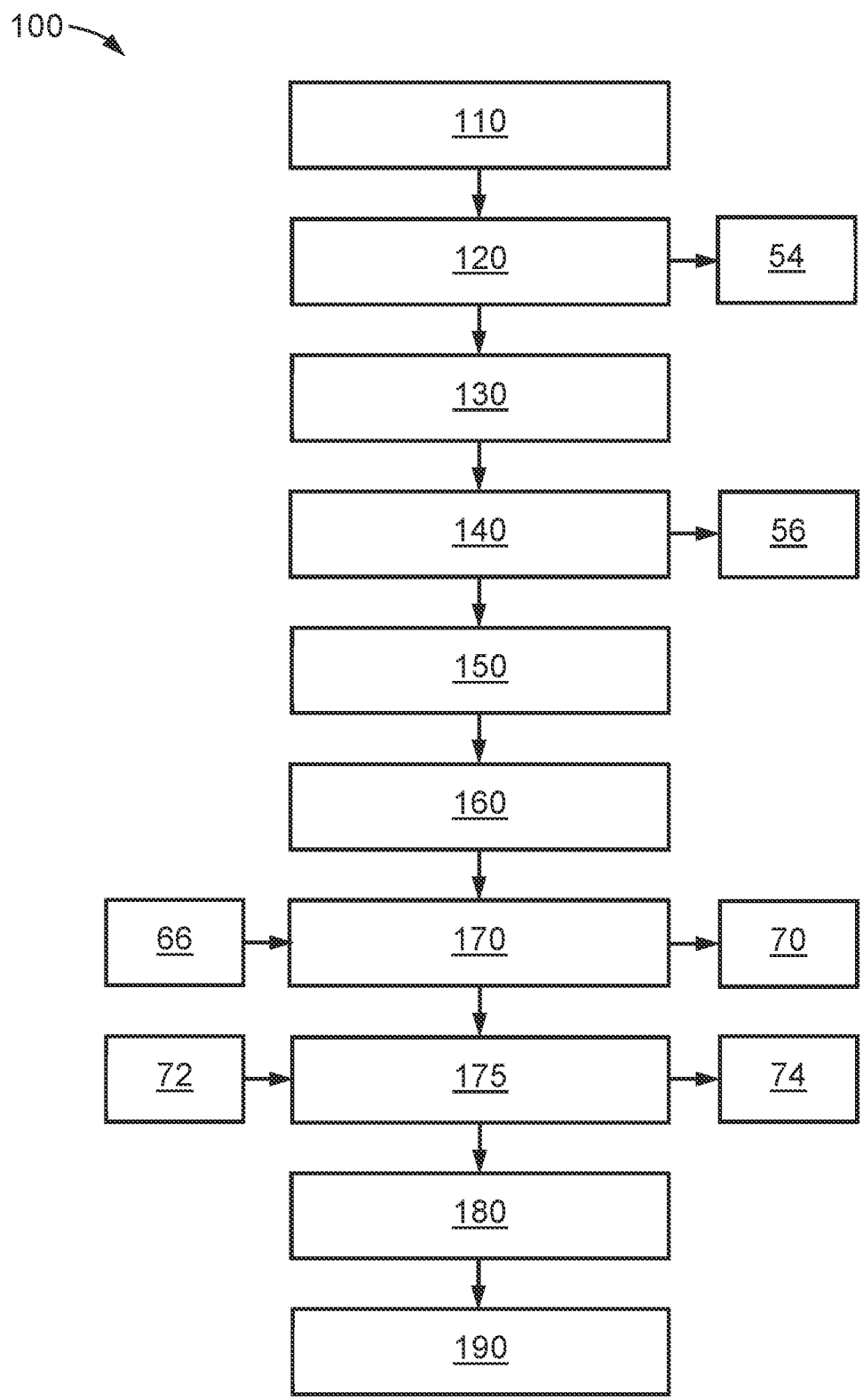
FIGS. 27-31 are flowcharts corresponding to the first through fifth sequences of steps for manufacturing a reinforced composite assembly.

FIGS. 22A-D show a sequence of manufacturing steps for the first method 100 in which the reinforced composite assembly 20 has the first configuration, and FIG. 27 is a flowchart of the first method 100. (Note that some of the features in the following description are found in other drawings besides FIGS. 22 and 27.) At block 110 (FIG. 22A), a metallic plate 26 having a third area $A_3$ and a third perimeter $P_3$ is disposed onto a second sheet 24 made of a non-carbon fiber material and having a second area $A_2$ and a second perimeter $P_2$. Here, the metallic plate 26 is disposed within the second perimeter $P_2$ and has (i) a plurality of holes 28 formed therein about the third perimeter $P_3$ and defining a plurality of respective bridge portions 29 between each of the holes 28 and an adjacent outer edge 30 of the metallic plate 26, and/or (ii) a plurality of extensions 34 extending outward from a main portion 36 of the metallic plate 26. At block 120 (FIG. 22B), each of the bridge portions 29 and extensions 34 is secured to the second sheet 24 using a first arrangement of thread stitching 38, thereby producing a metallic plate-second sheet sub-assembly 54. At block 130 (FIG. 22C), the metallic plate-second sheet sub-assembly 54 is placed onto a first sheet 22 made of carbon fiber and having a first area $A_1$ and a first perimeter $P_1$, wherein the metallic plate-second sheet sub-assembly 54 is disposed within the first perimeter $P_1$ and the second sheet 24 separates the metallic plate 26 from the first sheet 22. And at block 140 (FIG. 22D), the second sheet 24 is fastened to the first sheet 22 using a second arrangement of thread stitching 43, thereby producing a reinforced preform assembly 56, which is also a reinforced composite assembly 20. In the above steps (and as noted earlier), the first sheet 22 has a first perimeter $P_1$, the second sheet 24 has a second perimeter $P_2$ and is disposed within the first perimeter $P_1$, and the metallic plate 26 has a third perimeter $P_3$ and is disposed within the second perimeter $P_2$. Additionally, the second area $A_2$ may be smaller than the first area $A_1$, and the third area $A_3$ may be smaller than the second area $A_2$.

After the above assembly steps, the reinforced preform assembly 56 may further undergo the following molding steps as part of the first method 100. At block 150, the reinforced preform assembly 56 may be set or placed into a mold cavity 60 (see FIG. 20), and at block 160, a mold plug 62 may be closed against the mold cavity 60 to form a closed mold 64 (see FIG. 21). At block 170, a resin 66 may be injected into the closed mold 64 (see FIG. 21) so as to saturate at least one or more selected portions 68 of the reinforced preform assembly 56 with the resin 66, thereby creating a saturated reinforced preform assembly 70. (Note that some other portions 69 of the reinforced preform assembly 56 might not be saturated with resin 66, but the selected/saturated portions 68 and other/non-saturated portions 69 together make up the saturated reinforced preform assembly 70.) At block 180, the closed mold 64 is opened by separating the mold plug 62 from the mold cavity 60 so as to expose the saturated reinforced preform assembly 70, and at block 190 the saturated reinforced preform assembly 70 is removed from the mold cavity 60. Note that an optional step may be performed at block 175, in which a predetermined amount of heat 72 is applied to the saturated reinforced preform assembly 70 while in the closed mold 64, until a predetermined level of cure 74 of the resin 66 is produced in the saturated reinforced preform assembly 70.

Note that FIGS. 27-31 have a central vertical column of blocks or steps, and that some of these central column blocks have another block on the left with an arrow pointing from the left block to the central column block, and/or another block on the right with an arrow pointing from the central column block to the right block. For example, in FIG. 27, blocks 120 and 140 each have a respective block on the right (i.e., blocks 54 and 56), while blocks 170 and 175 each have a respective block on the left (i.e., blocks 66 and 72) and on the right (i.e., blocks 70 and 74). The blocks on the left represent inputs for the associated central column block, and the blocks on the right represent outputs or outcomes for the associated central column block. Thus, in FIG. 27, block 72 (heat) is an input for block 175 (the step of applying heat 72 to the saturated reinforced preform assembly 70), and block 74 (a predetermined level of cure) is an output or outcome for block 175.

FIGS. 20-21 show cross-sectional elevation views of two mold arrangements, the features of which may be combined as desired. As shown in FIG. 20, the mold cavity 60 may include a guide pin 76 extending upward from a mold surface 78, and the metallic plate 26 may include an aperture 45 therethrough configured for mating with the guide pin 76 for positioning of the metallic plate 26 with respect to the mold cavity 60. As shown in FIG. 21, a respective plug seal 80 may be disposed in at least one of the mold cavity 60 and the mold plug 62, wherein each respective plug seal 80 is configured to be biased by biasing elements 82 (e.g., springs, hydraulics, pneumatics, etc.) against a tapped or threaded hole 84 within a tubular member 40$_T$ attached to the metallic plate 26 when the mold is closed (i.e., when the closed mold 64 is formed). Each respective plug seal 80 may be made of elastomer or other sealing material, and may be used to prevent the flow of resin 66 into the threaded hole of the tubular member $40_T$. And as shown in FIG. 20, a resin seal 86 may be disposed between the mold cavity 60 and the reinforced preform assembly 56 and around an aperture 45 formed in the metallic plate 26 when the reinforced preform assembly 56 is positioned into the mold cavity 60. This resin seal 86 may be formed as a ring or other shape, and acts to seal off the aperture 45 against the flow of resin 66 when the resin 66 is injected into the closed mold 64.

Figure 28:
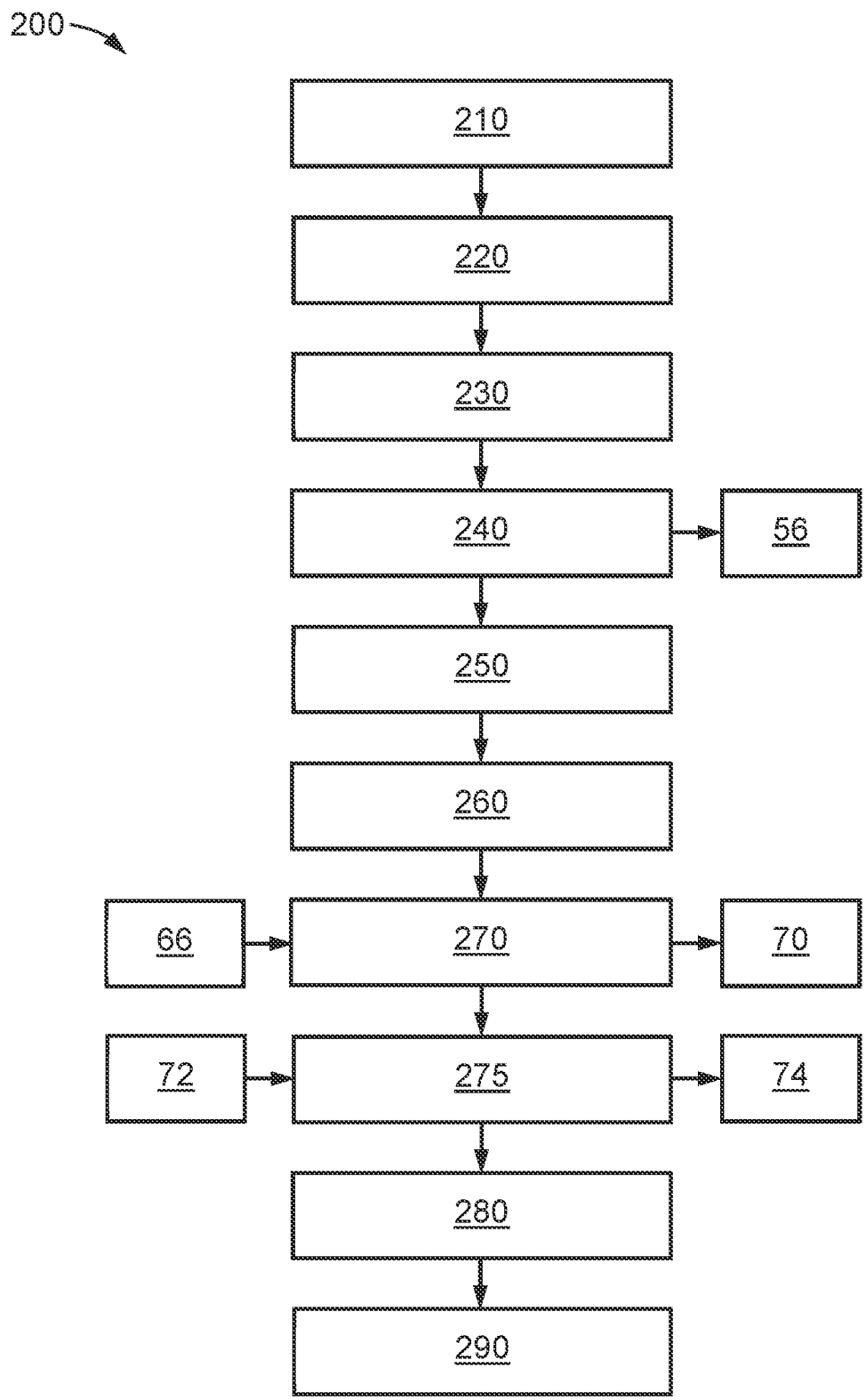

FIGS. 23A-D show a sequence of manufacturing steps for the second method 200 in which the reinforced composite assembly 20 has the first configuration, and FIG. 28 is a flowchart of the second method 200. (Note that some of the features in the following description are found in other drawings besides FIGS. 23 and 28.) At block 210 (FIG. 23A), a second sheet 24 made of a non-carbon fiber material and having a second area $A_2$ and a second perimeter $P_2$ is positioned onto a first sheet 22 made of carbon fiber and having a first area $A_1$ and a first perimeter $P_1$, wherein the second sheet 24 is disposed within the first perimeter $P_1$. At block 220 (FIG. 23B), the second sheet 24 is fastened to the first sheet 22 using a second arrangement of thread stitching 43. At block 230 (FIG. 23C), a metallic plate 26 having a third area $A_3$ and a third perimeter $P_3$ is disposed onto the second sheet 24 within the second perimeter $P_2$. Here, the metallic plate 26 has (i) a plurality of holes 28 formed therein about the third perimeter $P_3$ and defining a plurality of respective bridge portions 29 between each of the holes 28 and an adjacent outer edge 30 of the metallic plate 26, and/or (ii) a plurality of extensions 34 extending outward from a main portion 36 of the metallic plate 26. And at block 240 (FIG. 23D), each of the bridge portions 29 and extensions 34 is secured to the second sheet 24 or to the first and second sheets 22, 24 using a first arrangement of thread stitching 38, thereby producing a reinforced preform assembly 56, which is also a reinforced composite assembly 20. In the above steps (and as noted earlier), the first sheet 22 has a first perimeter $P_1$, the second sheet 24 has a second perimeter $P_2$ and is disposed within the first perimeter $P_1$, and the metallic plate 26 has a third perimeter $P_3$ and is disposed within the second perimeter $P_2$. Additionally, the second area $A_2$ may be smaller than the first area $A_1$, and the third area $A_3$ may be smaller than the second area $A_2$.

After the above assembly steps, the reinforced preform assembly 56 may further undergo the following molding steps as part of the second method 200. At block 250, the reinforced preform assembly 56 may be set or placed into a mold cavity 60 (see FIG. 20), and at block 260, a mold plug 62 may be closed against the mold cavity 60 to form a closed mold 64 (see FIG. 21). At block 270, a resin 66 may be injected into the closed mold 64 (see FIG. 21) so as to saturate at least one or more selected portions 68 of the reinforced preform assembly 56 with the resin 66, thereby creating a saturated reinforced preform assembly 70. (Note that some other portions 69 of the reinforced preform assembly 56 might not be saturated with resin 66, but the selected/saturated portions 68 and other/non-saturated portions 69 together make up the saturated reinforced preform assembly 70.) At block 280, the closed mold 64 is opened by separating the mold plug 62 from the mold cavity 60 so as to expose the saturated reinforced preform assembly 70, and at block 290 the saturated reinforced preform assembly 70 is removed from the mold cavity 60. Note that an optional step may be performed at block 275, in which a predetermined amount of heat 72 is applied to the saturated reinforced preform assembly 70 while in the closed mold 64, until a predetermined level of cure 74 of the resin 66 is produced in the saturated reinforced preform assembly 70.

Note that the description of the mold features (as shown in FIGS. 20-21) that are discussed above in connection with the first method 100 also apply in connection with the second method 200.

Figure 24A:
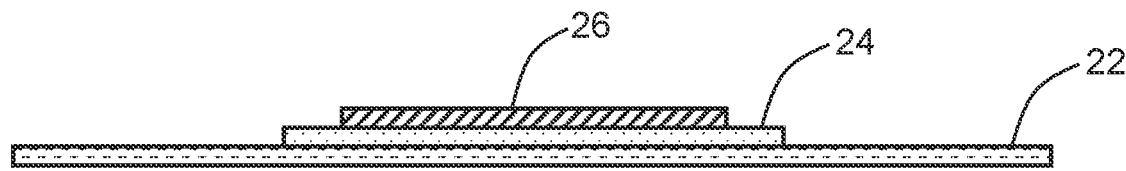
FIGS. 24A-B are schematic cross-sectional elevation views representing a third sequence of steps for manufacturing a reinforced composite assembly according to the first configuration.
Figure 24B:
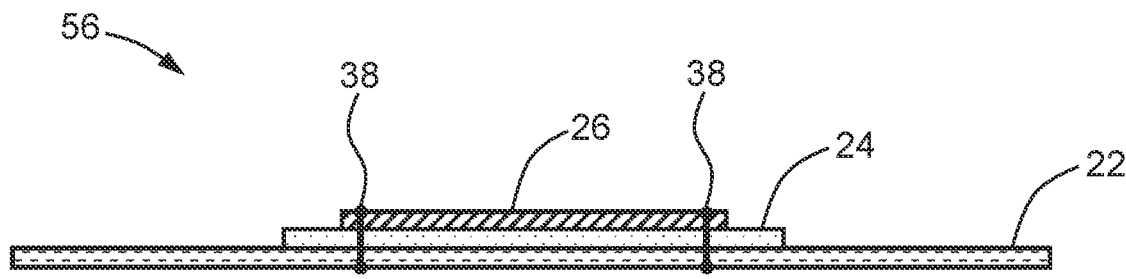
Figure 29:
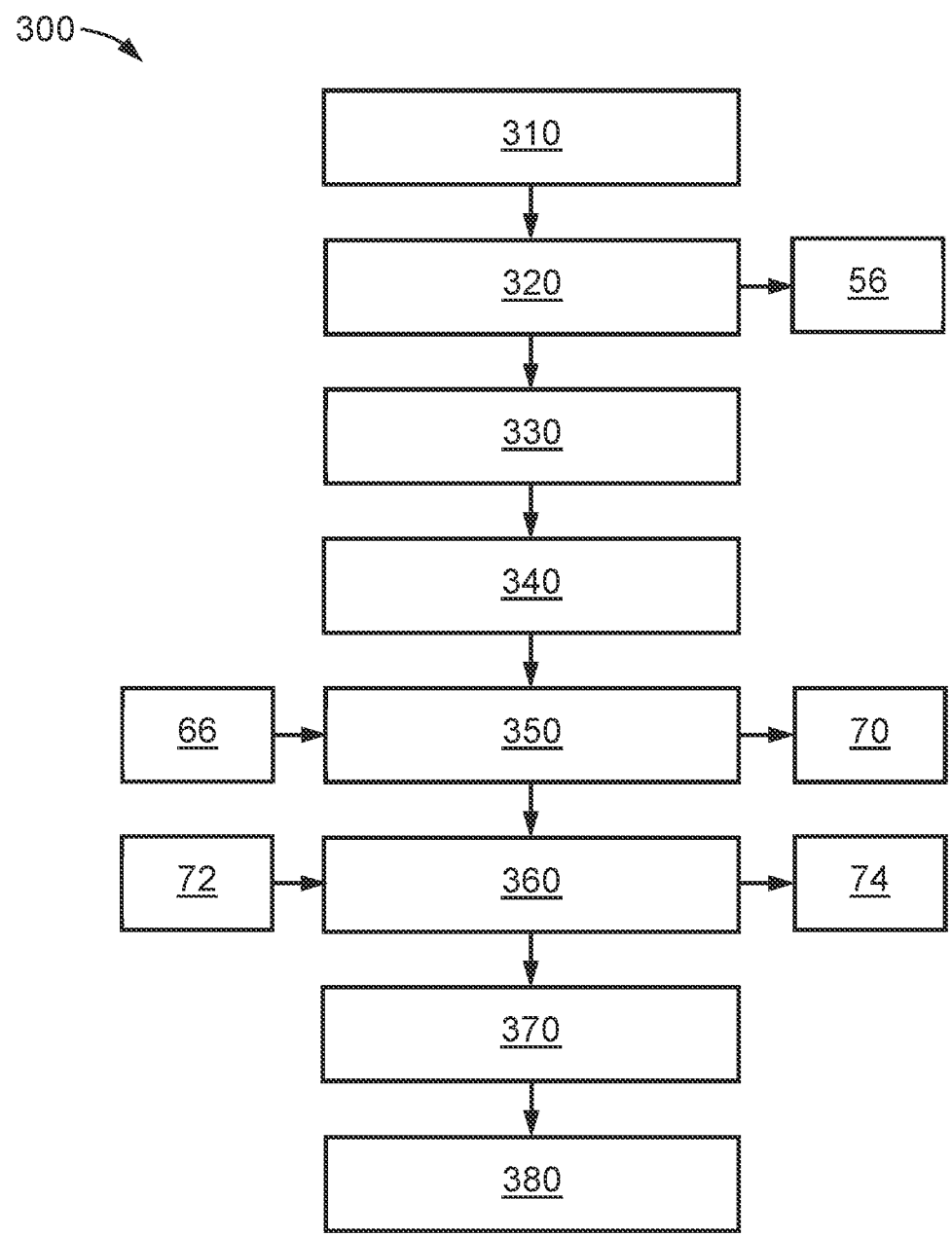

FIGS. 24A-B show a sequence of manufacturing steps for the third method 300 in which the reinforced composite assembly 20 has the first configuration, and FIG. 29 is a flowchart of the third method 300. (Note that some of the features in the following description are found in other drawings besides FIGS. 24 and 29.) At block 310 (FIG. 24A), a second sheet 24 made of a non-carbon fiber material (and having a second area $A_2$ and a second perimeter $P_2$) is sandwiched between a first sheet 22 made of carbon fiber (and having a first area $A_1$ and a first perimeter $P_1$) and a metallic plate 26 (having a third area $A_3$ and a third perimeter $P_3$). Here, the metallic plate 26 has (i) a plurality of holes 28 formed therein about the third perimeter $P_3$ and defining a plurality of respective bridge portions 29 between each of the holes 28 and an adjacent outer edge 30 of the metallic plate 26, and/or (ii) a plurality of extensions 34 extending outward from a main portion 36 of the metallic plate 26. And at block 320 (FIG. 24B), each of the bridge portions 29 and extensions 34 is connected to the first and second sheets 22, 24 using a first arrangement of thread stitching 38, thereby producing a reinforced preform assembly 56, which is also a reinforced composite assembly 20. In the above steps (and as noted earlier), the first sheet 22 has a first perimeter $P_1$, the second sheet 24 has a second perimeter $P_2$ and is disposed within the first perimeter $P_1$, and the metallic plate 26 has a third perimeter $P_3$ and is disposed within the second perimeter $P_2$. Additionally, the second area $A_2$ may be smaller than the first area $A_1$, and the third area $A_3$ may be smaller than the second area $A_2$.

After the above assembly steps, the reinforced preform assembly 56 may further undergo the following molding steps as part of the third method 300. At block 330, the reinforced preform assembly 56 may be set or placed into a mold cavity 60 (see FIG. 20), and at block 340, a mold plug 62 may be closed against the mold cavity 60 to form a closed mold 64 (see FIG. 21). At block 350, a resin 66 may be injected into the closed mold 64 (see FIG. 21) so as to saturate at least one or more selected portions 68 of the reinforced preform assembly 56 with the resin 66, thereby creating a saturated reinforced preform assembly 70. (Note that some other portions 69 of the reinforced preform assembly 56 might not be saturated with resin 66, but the selected/saturated portions 68 and other/non-saturated portions 69 together make up the saturated reinforced preform assembly 70.) At block 370, the closed mold 64 is opened by separating the mold plug 62 from the mold cavity 60 so as to expose the saturated reinforced preform assembly 70, and at block 380 the saturated reinforced preform assembly 70 is removed from the mold cavity 60. Note that an optional step may be performed at block 360, in which a predetermined amount of heat 72 is applied to the saturated reinforced preform assembly 70 while in the closed mold 64, until a predetermined level of cure 74 of the resin 66 is produced in the saturated reinforced preform assembly 70.

Note that the description of the mold features (as shown in FIGS. 20-21) that are discussed above in connection with the first method 100 also apply in connection with the third method 300.

Figure 25A:
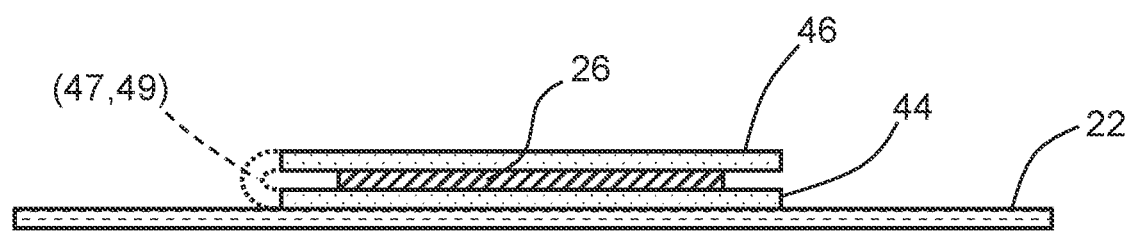
FIGS. 25A-B are schematic cross-sectional elevation views representing a fourth sequence of steps for manufacturing a reinforced composite assembly according to the second configuration.
Figure 25B:
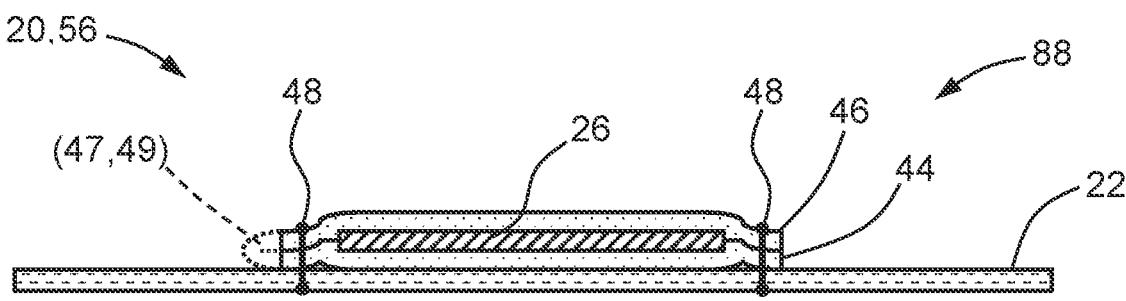
Figure 26A:
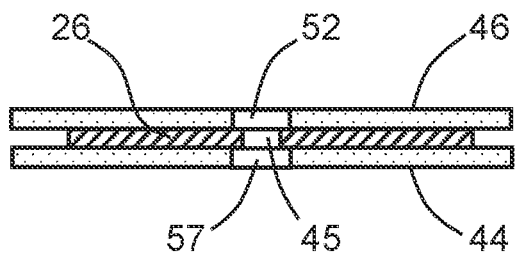
FIGS. 26A-D are schematic cross-sectional elevation views representing a fifth sequence of steps for manufacturing a reinforced composite assembly according to the second configuration.
Figure 26B:
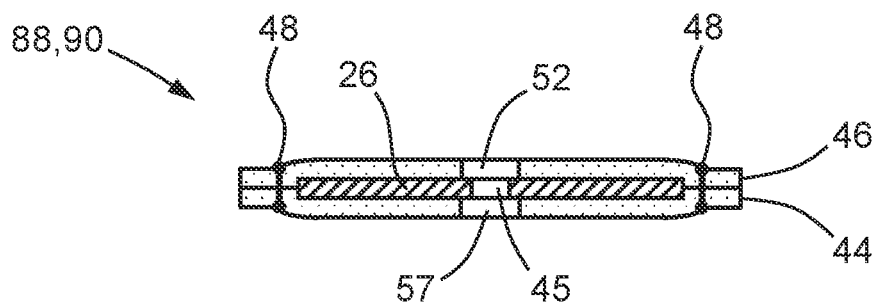
Figure 26C:
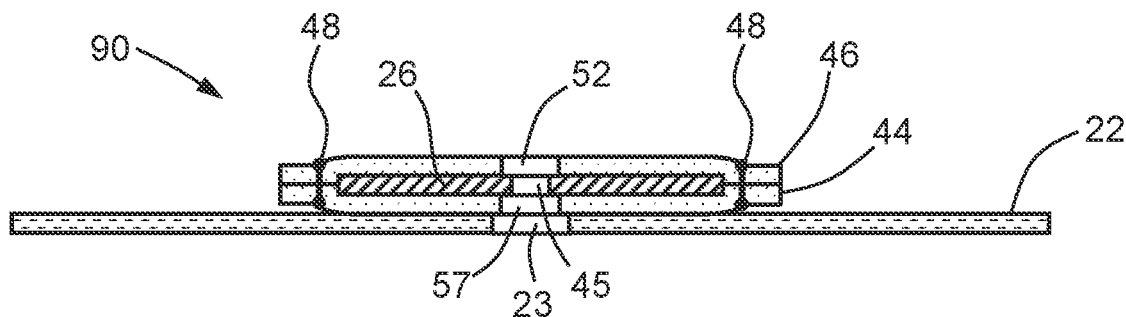
Figure 26D:
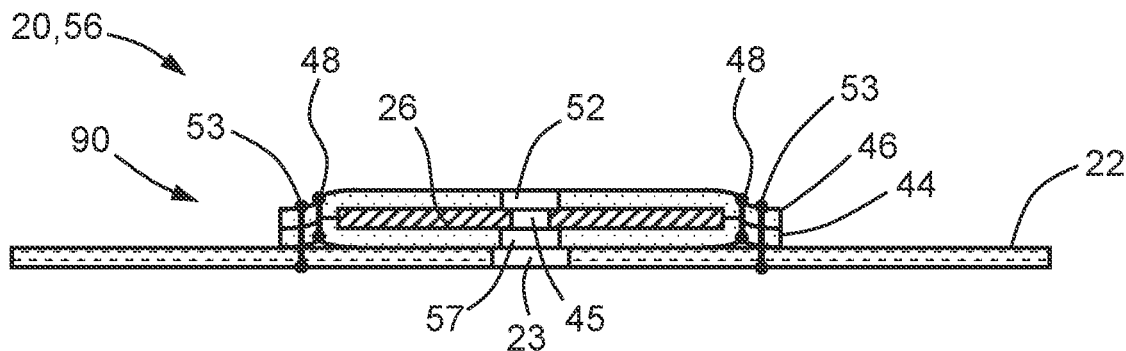
Figure 30:
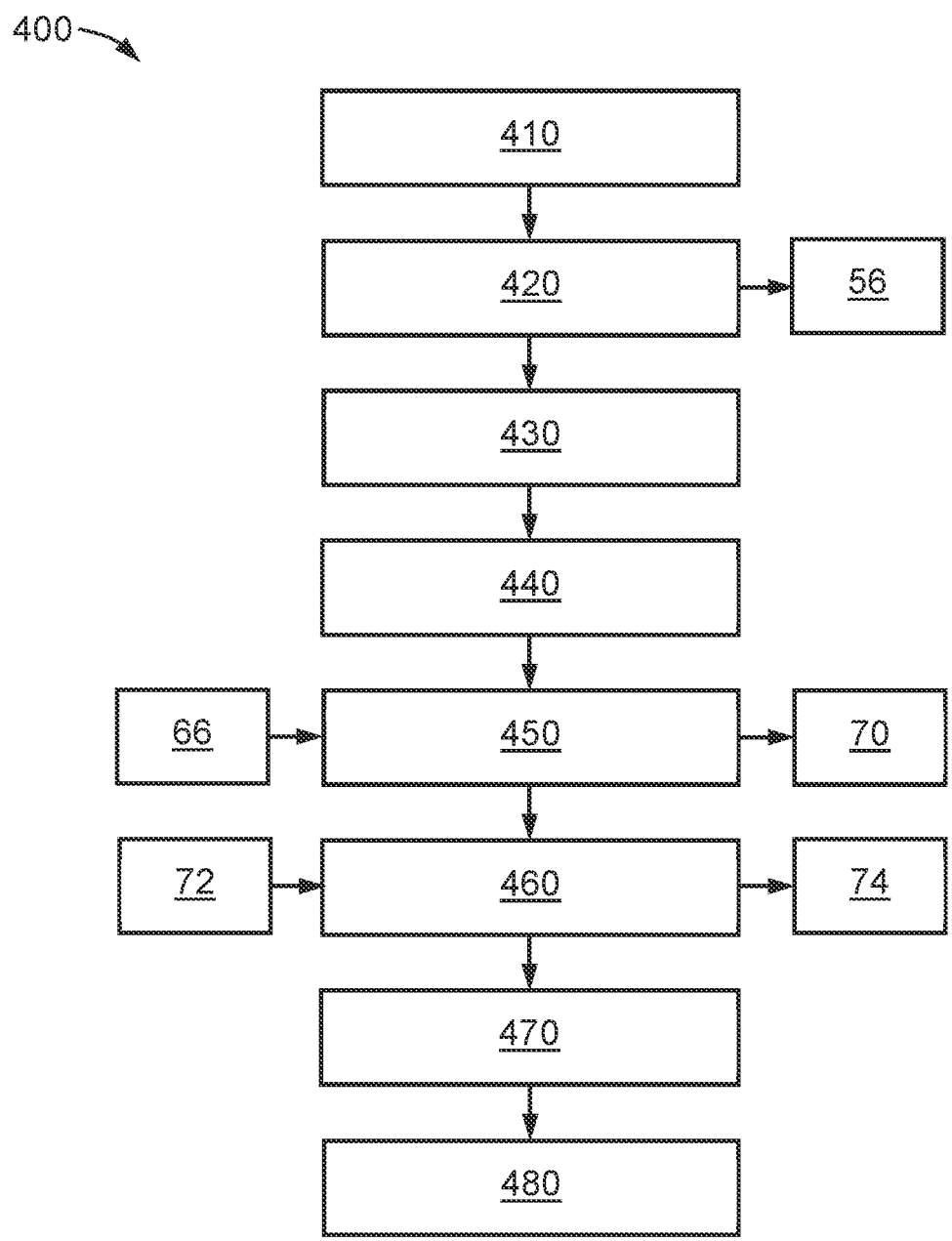

FIGS. 25A-B show a sequence of manufacturing steps for the fourth method 400 in which the reinforced composite assembly 20 has the second configuration, and FIG. 30 is a flowchart of the fourth method 400. (Note that some of the features in the following description are found in other drawings besides FIGS. 25 and 30.) At block 410 (FIG. 25A), a first layer 44 made of non-carbon fiber material and having a second area $A_2$ and a second perimeter $P_2$ is stacked on top of a first sheet 22 made of carbon fiber and having a first area $A_1$ and a first perimeter $P_1$ (wherein the first layer 44 is disposed within the first perimeter $P_1$), a metallic plate 26 having a third area $A_3$ and a third perimeter $P_3$ is stacked on top of the first layer 44 (wherein the metallic plate 26 is disposed within the second perimeter $P_2$), and a second layer 46 made of non-carbon fiber material and having a fourth area $A_4$ and a fourth perimeter $P_4$ is stacked on top of the metallic plate 26 (such that the metallic plate 26 is disposed within the fourth perimeter $P_4$). And at block 420 (FIG. 25B), the first layer 44, the second layer 46 and the first sheet 22 are interconnected with each other about the third perimeter $P_3$ of the metallic plate 26 using a first set of thread stitching 48, thereby producing a reinforced preform assembly 56, which is also a reinforced composite assembly 20. In the above steps, the first sheet 22 has a first perimeter $P_1$, the first layer 44 has a second perimeter $P_2$ and is disposed within the first perimeter $P_1$, and the metallic plate 26 has a third perimeter $P_3$ and is disposed within the second perimeter $P_2$ and the fourth perimeter $P_4$. Additionally, the second area $A_2$ may be smaller than the first area $A_1$, the third area $A_3$ may be smaller than the second area $A_2$, and optionally the fourth area $A_4$ may be about the same as the second area $A_2$.

After the above assembly steps, the reinforced preform assembly 56 may further undergo the following molding steps as part of the fourth method 400. At block 430, the reinforced preform assembly 56 may be set or placed into a mold cavity 60 (see FIG. 20), and at block 440, a mold plug 62 may be closed against the mold cavity 60 to form a closed mold 64 (see FIG. 21). At block 450, a resin 66 may be injected into the closed mold 64 (see FIG. 21) so as to saturate at least one or more selected portions 68 of the reinforced preform assembly 56 with the resin 66, thereby creating a saturated reinforced preform assembly 70. (Note that some other portions 69 of the reinforced preform assembly 56 might not be saturated with resin 66, but the selected/saturated portions 68 and other/non-saturated portions 69 together make up the saturated reinforced preform assembly 70.) At block 470, the closed mold 64 is opened by separating the mold plug 62 from the mold cavity 60 so as to expose the saturated reinforced preform assembly 70, and at block 480 the saturated reinforced preform assembly 70 is removed from the mold cavity 60. Note that an optional step may be performed at block 460, in which a predetermined amount of heat 72 is applied to the saturated reinforced preform assembly 70 while in the closed mold 64, until a predetermined level of cure 74 of the resin 66 is produced in the saturated reinforced preform assembly 70.

Note that the description of the mold features (as shown in FIGS. 20-21) that are discussed above in connection with the first method 100 also apply in connection with the fourth method 400.

Figure 31:
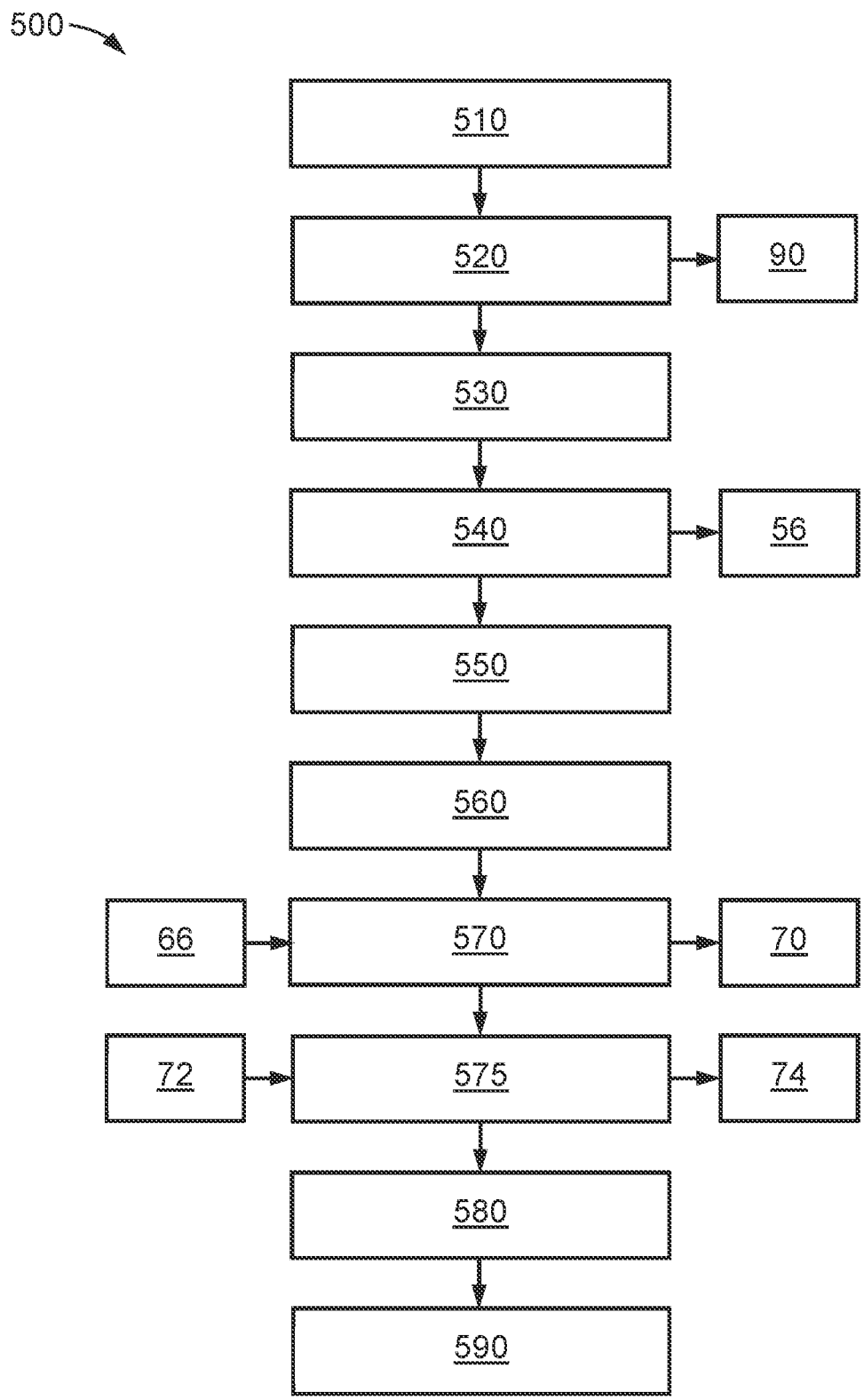

FIGS. 26A-D shows a sequence of manufacturing steps for the fifth method 500 in which the reinforced composite assembly 20 has the second configuration, and FIG. 31 is a flowchart of the fifth method 500. (Note that some of the features in the following description are found in other drawings besides FIGS. 26 and 31.) At block 510 (FIG. 26A), a metallic plate 26 having a third area $A_3$ and a third perimeter $P_3$ is interposed between first and second layers 44, 46 made of non-carbon fiber material and having respective second and fourth areas $A_2$, $A_4$ and respective second and fourth perimeters $P_2$, $P_4$. In this interposition, the metallic plate 26 is disposed within each of the third and fourth perimeters $P_3$, $P_4$. At block 520 (FIG. 26B), the first and second layers 44, 46 are joined about the third perimeter $P_3$ of the metallic plate 26 using a first set of thread stitching 48 so as to capture the metallic plate 26 within a closed pocket 88 formed around the metallic plate 26 by the first and second layers 44, 46 and the first set of thread stitching 48, thereby forming a pocketed metallic plate sub-assembly 90. At block 530 (FIG. 26C), the pocketed metallic plate sub-assembly 90 is situated onto a first sheet 22 made of carbon fiber and having a first area $A_1$ and a first perimeter $P_1$, with the pocketed metallic plate sub-assembly 90 disposed within the first perimeter $P_1$. And at block 540 (FIG. 26D), at least one of the first and second layers 44, 46 is/are attached to the first sheet 22 about the third perimeter $P_3$ of the metallic plate 26 using a second set of thread stitching 53, thereby producing a reinforced preform assembly 56, which is also a reinforced composite assembly 20. In the above steps (and as noted earlier), the first sheet 22 has a first perimeter $P_1$, the first layer 44 has a second perimeter $P_2$ and is disposed within the first perimeter $P_1$, and the metallic plate 26 has a third perimeter $P_3$ and is disposed within the second perimeter $P_2$ and the fourth perimeter $P_4$. Additionally, the second area $A_2$ may be smaller than the first area $A_1$, the third area $A_3$ may be smaller than the second area $A_2$, and optionally the fourth area $A_4$ may be about the same as the second area $A_2$.

After the above assembly steps, the reinforced preform assembly 56 may further undergo the following molding steps as part of the fifth method 500. At block 550, the reinforced preform assembly 56 may be set or placed into a mold cavity 60 (see FIG. 20), and at block 560, a mold plug 62 may be closed against the mold cavity 60 to form a closed mold 64 (see FIG. 21). At block 570, a resin 66 may be injected into the closed mold 64 (see FIG. 21) so as to saturate at least one or more selected portions 68 of the reinforced preform assembly 56 with the resin 66, thereby creating a saturated reinforced preform assembly 70. (Note that some other portions 69 of the reinforced preform assembly 56 might not be saturated with resin 66, but the selected/saturated portions 68 and other/non-saturated portions 69 together make up the saturated reinforced preform assembly 70.) At block 580, the closed mold 64 is opened by separating the mold plug 62 from the mold cavity 60 so as to expose the saturated reinforced preform assembly 70, and at block 590 the saturated reinforced preform assembly 70 is removed from the mold cavity 60. Note that an optional step may be performed at block 575, in which a predetermined amount of heat 72 is applied to the saturated reinforced preform assembly 70 while in the closed mold 64, until a predetermined level of cure 74 of the resin 66 is produced in the saturated reinforced preform assembly 70.

Note that the description of the mold features (as shown in FIGS. 20-21) that are discussed above in connection with the first method 100 also apply in connection with the fifth method 500.

It may be noted that the words "securing", "fastening", "connecting", "joining", "attaching" and "interconnecting" (and their related forms) have been variously used throughout the present disclosure to describe connections between or among two or more sheets 22, 24 and/or layers 44, 46. These words may be viewed as interchangeable equivalents with each other, in that they represent different ways of describing the aforementioned connections between or among two or more sheets 22, 24 and/or layers 44, 46. In all of these instances, the connections are achieved by sewing or stitching using suitable thread or filaments.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "for the most part", "to a significant extent" and/or "to a large degree", and do not necessarily mean "perfectly", "completely", "strictly" or "entirely". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A reinforced composite assembly, comprising:
    a first sheet made of carbon fiber and having a first perimeter;
    a second sheet made of a non-carbon fiber material and having a second perimeter, wherein the second sheet is disposed atop the first sheet within the first perimeter;
    a metallic plate having a third perimeter, wherein the metallic plate is disposed atop the second sheet within the second perimeter, the metallic plate having
        a plurality of extensions extending outward from a main portion of the metallic plate; and
    a first arrangement of thread stitching securing each of the extensions to the second sheet or to the first and second sheets.

2. A reinforced composite assembly according to claim 1, wherein each of the plurality of extensions is shaped as one of a T-shape, an L-shape, a U-shape having first and second ends wherein each of the first and second ends is contiguous with the main portion, a key head shape having a straight portion extending outward from the main portion and terminating in a closed loop portion, and a tab having one or more through-holes therein.

3. A reinforced composite assembly according to claim 1, wherein the metallic plate includes a plurality of holes therein about a perimeter of the metallic plate and defining a plurality of respective bridge portions between each of the holes and an adjacent outer edge of the metallic plate, wherein each of the holes is shaped as one of a circular hole, an ellipsoidal hole, a square hole, a rounded straight slot, and a rectangular slot.

4. A reinforced composite assembly according to claim 3, wherein the metallic plate includes at least one aperture therethrough located inward from the plurality of holes.

5. A reinforced composite assembly according to claim 1, further comprising:
    a metallic member having a first portion thereof attached to the metallic plate and a second portion thereof extending away from the metallic plate.

6. A reinforced composite assembly according to claim 1, wherein the first sheet has a first area, the second sheet has a second area smaller than the first area, and the metallic plate has a third area smaller than the second area.

7. A reinforced composite assembly according to claim 1, further comprising:
    a second arrangement of thread stitching securing the second sheet to the first sheet.

8. A reinforced composite assembly according to claim 1, wherein the first arrangement of thread stitching comprises a plurality of individual stitches, wherein each individual stitch extends across at least a portion of a respective one of the plurality of extensions.

9. A method of manufacturing a reinforced composite assembly, comprising:
    disposing a metallic plate having a third perimeter onto a second sheet made of a non-carbon fiber material and having a second perimeter, wherein the metallic plate is disposed within the second perimeter and has a plurality of extensions extending outward from a main portion of the metallic plate thereby producing a metallic plate-second sheet sub-assembly;
    placing the metallic plate-second sheet sub-assembly onto a first sheet made of carbon fiber and having a first perimeter, wherein the metallic plate-second sheet sub-assembly is disposed within the first perimeter and the second sheet separates the metallic plate from the first sheet; and
    securing each of the extensions to the second sheet or to the first and second sheets using a first arrangement of thread stitching, thereby producing a reinforced preform assembly.

10. A method according to claim 9, further comprising:
    setting the reinforced preform assembly into a mold cavity;
    closing a mold plug against the mold cavity to form a closed mold;
    injecting a resin into the closed mold so as to saturate at least a selected portion of the reinforced preform assembly with the resin, thereby creating a saturated reinforced preform assembly;
    opening the closed mold by separating the mold plug from the mold cavity so as to expose the saturated reinforced preform assembly; and
    removing the saturated reinforced preform assembly from the mold cavity.

11. A method according to claim 10, further comprising:
    applying heat to the saturated reinforced preform assembly while in the closed mold until a predetermined level of cure of the resin is produced.

12. A method according to claim 10, wherein the mold cavity includes a guide pin extending upward from a mold surface and the metallic plate includes an aperture therethrough configured for mating with the guide pin.

13. A method according to claim 10, wherein a respective plug seal is disposed in at least one of the mold cavity and the mold plug, wherein each respective plug seal is configured to be biased against a tapped hole within a tubular member attached to the metallic plate when the mold is closed.

14. A method according to claim 10, wherein a resin seal is disposed between the mold cavity and the reinforced preform assembly and around an aperture formed in the metallic plate when the reinforced preform assembly is positioned into the mold cavity.

15. A method according to claim 9, wherein the first sheet has a first area, the second sheet has a second area smaller than the first area, and the metallic plate has a third area smaller than the second area.

16. A reinforced composite assembly, comprising:
   a first sheet made of carbon fiber and having a first perimeter;
   a first layer of non-carbon fiber material having a second perimeter, wherein the first layer is disposed atop the first sheet within the first perimeter;
   a metallic plate having a third perimeter, wherein the metallic plate is disposed atop the first layer within the second perimeter, the metallic plate having a plurality of extensions extending outward from a main portion of the metallic plate;
   a second layer of non-carbon fiber material having a fourth perimeter, wherein the second layer is disposed atop the metallic plate such that the metallic plate is disposed within the fourth perimeter; and
   a first arrangement of thread stitching securing each of the extensions to the first layer or to the first sheet and the first layer.

17. A reinforced composite assembly according to claim 16, wherein the first arrangement of thread stitching further secures the first sheet with the first and second layers.

18. A reinforced composite assembly according to claim 16, wherein the first and second layers are formed from a single sheet of non-carbon fiber material folded so as to dispose the first and second layers in facing relationship with each other.

19. A reinforced composite assembly according to claim 16, wherein the metallic plate and the second layer include respective first and second apertures therethrough, wherein the first and second apertures overlap with each other such that an entirety of the first aperture projects through the second aperture.

20. A reinforced composite assembly according to claim 16, further comprising:
   a second arrangement of thread stitching securing together at least one of the first and second layers with the first sheet.

* * * * *